US010036356B2

(12) United States Patent
Svensson

(10) Patent No.: US 10,036,356 B2
(45) Date of Patent: Jul. 31, 2018

(54) DUCTED COMBUSTION SYSTEMS UTILIZING DUCT-EXIT TABS

(71) Applicant: Caterpillar Inc., Peoria, IL (US)

(72) Inventor: Kenth Svensson, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/373,055

(22) Filed: Dec. 8, 2016

(65) Prior Publication Data

US 2017/0089310 A1   Mar. 30, 2017

Related U.S. Application Data

(63) Continuation-in-part of application No. 14/685,264, filed on Apr. 13, 2015, now Pat. No. 9,587,606.

(51) Int. Cl.
*F02M 55/00* (2006.01)
*F02M 61/18* (2006.01)
*F02M 61/14* (2006.01)

(52) U.S. Cl.
CPC ............ *F02M 55/00* (2013.01); *F02M 61/14* (2013.01); *F02M 61/182* (2013.01); *F02M 61/1806* (2013.01); *F02M 61/1833* (2013.01)

(58) Field of Classification Search
CPC .............. F02M 55/00; F02M 61/1813; F02M 61/1806; F02M 61/182
USPC ...................... 123/298, 305, 193.5
See application file for complete search history.

(56) References Cited

U.S. PATENT DOCUMENTS

| 8,967,129 B2 * | 3/2015 | Mueller | F02B 3/00 123/193.4 |
| 2005/0217639 A1 * | 10/2005 | Hill | F02B 23/0651 123/298 |
| 2012/0261497 A1 | 10/2012 | Friedrichs | |
| 2016/0097360 A1 | 4/2016 | Mueller | |
| 2016/0298529 A1 | 10/2016 | Anders et al. | |
| 2016/0298583 A1 | 10/2016 | Anders et al. | |

FOREIGN PATENT DOCUMENTS

| DE | 3321286 A * | 12/1983 | ......... F02M 61/1806 |
| DE | 102014117439 A1 * | 6/2015 | ......... F02M 61/1806 |

* cited by examiner

*Primary Examiner* — Mahmoud Gimie
(74) *Attorney, Agent, or Firm* — Miller, Matthias & Hull

(57) ABSTRACT

A ducted combustion system is disclosed. The ducted combustion system includes a combustion chamber bound by a flame deck surface of a cylinder head of an internal combustion engine and by a piston top surface of a piston disposed within the internal combustion engine. The system includes a fuel injector including one or more orifices, the one or more orifices injecting fuel into the combustion chamber as at least one fuel jet. The system includes at least one duct disposed within the combustion chamber between the flame deck surface and the piston top surface, the at least one duct including one or more structural tabs proximate to an outlet of the at least one duct and being disposed such that the at least one fuel jet, at least partially, enters one of the at least one duct upon being injected into the combustion chamber.

16 Claims, 25 Drawing Sheets

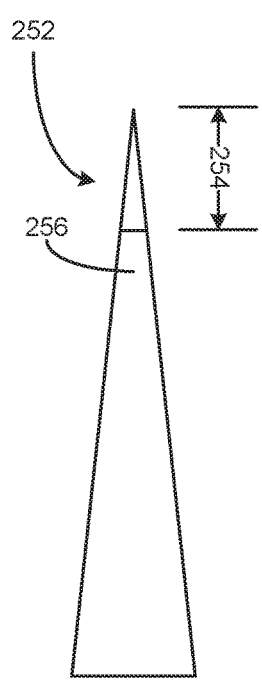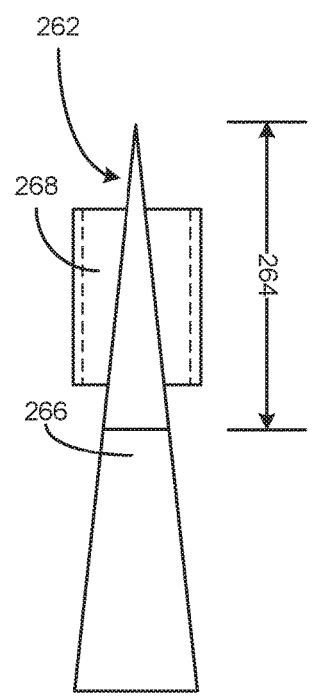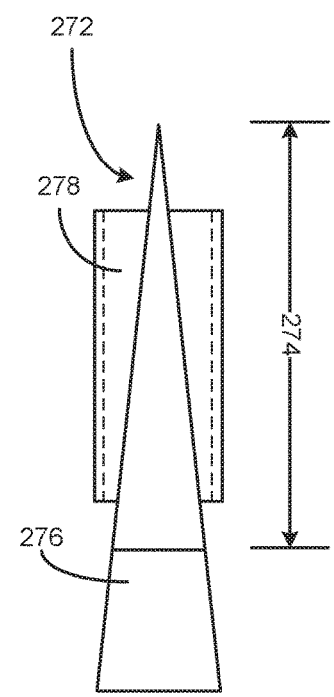
FIG. 42
*(Prior Art)*
FIG. 43
FIG. 44

DUCTED COMBUSTION SYSTEMS UTILIZING DUCT-EXIT TABS

CROSS-REFERENCE TO RELATED APPLICATIONS

This patent application is a continuation-in-part, under 35 U.S.C. § 120, of U.S. patent application Ser. No. 14/685,264, filed on Apr. 13, 2015, now U.S. Pat. No. 9,587,606.

STATEMENT OF GOVERNMENT INTEREST

This invention was made under a CRADA/PTS (CRADA No. SC16/01875.00.00 and PTS No. 1875.01.00) between Caterpillar, Inc. and Sandia National Laboratories, operating for the United States Department of Energy. The Government has certain rights in this invention.

TECHNICAL FIELD

The present disclosure generally relates to internal combustion engines and, more particularly, relates to ducted combustion systems for internal combustion engines.

BACKGROUND

Modern combustion engines may include one or more cylinders as part of the engine. The cylinder and an associated piston may define a combustion chamber therebetween. Within the combustion chamber, fuel for combustion is directly injected into the combustion chamber by, for example, a fuel injector, which is associated with the cylinder and has an orifice disposed such that it can directly inject fuel into the combustion chamber.

Different mixtures and/or equivalence ratios of the fuel/air mixture within the fuel jet may produce different results during combustion. The manners in which the injected fuel mixes and/or interacts with the air and other environmental elements of the combustion chamber may impact combustion processes and associated emissions. Further, if the fuel and air mixing is inadequate, then suboptimal or abnormally large amounts of soot may form within the combustion chamber.

To aid in preventing or reducing soot formation and to increase efficiency in such combustion engines, systems and methods for ducted combustion have been developed. For example, U.S. Patent Publication No. 2012/0186555 ("Ducted Combustion Chamber for Direct Injection Engines and Method") discloses ducted combustion within a combustion engine. The ducts of the '555 application generally include fins disposed around a fuel jet injected by a fuel injector. Such ducts may form a passageway corresponding to an orifice of the fuel injector, into which fuel jets are injected. The fuel jets may be channeled into the ducts, which may improve fuel combustion because upstream regions of a direct-injected fuel jet may be affected by faster and more uniform mixing as well as by an inhibition or reduction of entrainment of combustion products from downstream regions of the same or neighboring jets.

While the teachings of the '555 application are advantageous in providing an improved fuel/air mixture, further improvements in fuel/air mixtures are always desired, as such improvements may further reduce emissions and soot formation. Therefore, systems and methods for ducted combustion, that utilize structural features for improving fuel/air mixtures, are desired.

SUMMARY

In accordance with one aspect of the disclosure, a ducted combustion system is disclosed. The ducted combustion system may include a combustion chamber, which is defined as an enclosure bound at a first end by a flame deck surface of a cylinder head of an internal combustion engine and bound at a second end by a piston top surface of a piston disposed within the internal combustion engine. The system may further include a fuel injector in fluid connection with the combustion chamber and including one or more orifices opening from an injector tip of the fuel injector, the one or more orifices injecting fuel into the combustion chamber as at least one fuel jet. The system may further include at least one duct disposed within the combustion chamber between the flame deck surface and the piston top surface, the at least one duct including one or more structural tabs proximate to an outlet of the at least one duct and being disposed such that the at least one fuel jet, at least partially, enters the at least one duct upon being injected into the combustion chamber.

In accordance with another aspect of the disclosure, an internal combustion engine is disclosed. The internal combustion engine may include an engine block having at least one cylinder bore. The internal combustion engine may further include a cylinder head having a flame deck surface disposed at one end of the cylinder bore. The internal combustion engine may further include a piston connected to a crankshaft and configured to reciprocate within the cylinder bore, the piston having a piston top surface facing the flame deck surface such that a combustion chamber is defined within the cylinder bore bound at a first end by the flame deck surface and at a second end by the piston top surface. The internal combustion engine may further include a fuel injector in fluid connection with the combustion chamber and including one or more orifices opening from an injector tip of the fuel injector, the one or more orifices injecting fuel into the combustion chamber as at least one fuel jet. The internal combustion chamber may further include at least one duct disposed within the combustion chamber between the flame deck surface and the piston top surface, the at least one duct including one or more structural tabs proximate to an outlet of the at least one duct and being disposed such that the at least one fuel jet, at least partially, enters the at least one duct upon being injected into the combustion chamber.

In accordance with yet another aspect of the disclosure, a method for operating a combustion system is disclosed. The method may include injecting a fuel jet into a combustion chamber of an internal combustion engine, the combustion chamber defined as an enclosure bound at a first end by a flame deck of a cylinder of an internal combustion engine, and bound at a second end by a piston top surface of a piston disposed within the internal combustion engine. The method may further include directing the fuel jet, at least partially, into a duct, the duct including one or more structural tabs proximate to an outlet of the duct, to provide a substantially uniform mixture of fuel and air within the fuel jets.

Other features and advantages of the disclosed systems and principles will become apparent from reading the following detailed disclosure in conjunction with the included drawing figures.

BRIEF DESCRIPTION OF THE DRAWINGS

FIG. 42 is an example fuel jet having a flame lift-off length during combustion.

FIG. 43 is an example fuel jet having a flame lift-off length during combustion, the example fuel jet being injected through a duct.

FIG. 44 is an example fuel jet having a flame lift-off length during combustion, the example fuel jet being injected through a duct, the duct having a length optimized such that the flame has an equivalence ratio of less than 2 at the flame lift-off length.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
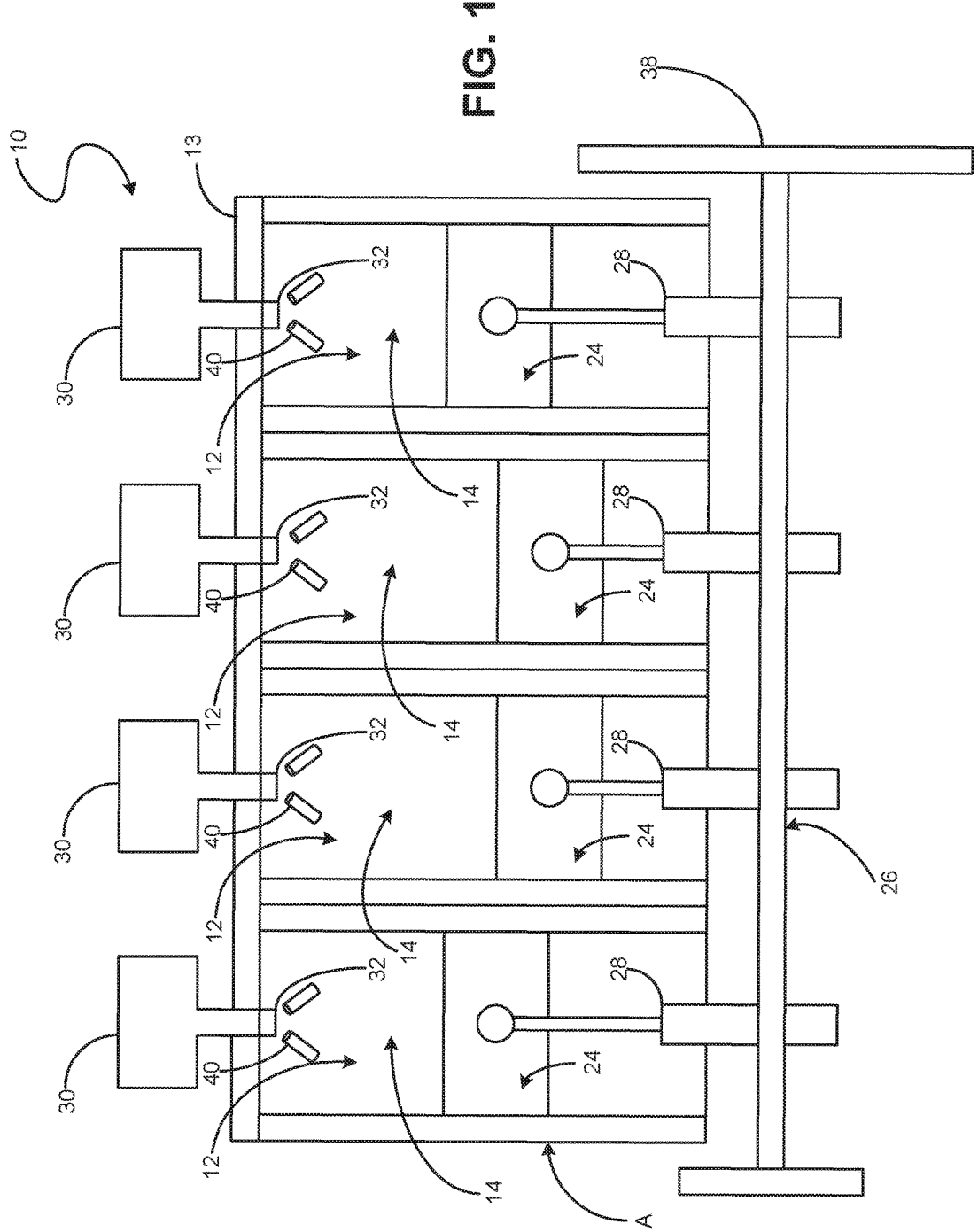
FIG. 1 is a side cross-sectional view of an internal combustion engine, in accordance with an embodiment of the present disclosure.

Turning now to the drawings and with specific reference to FIG. 1, a combustion engine 10 is shown. The engine 10 may be an internal combustion engine having a plurality of cylinders 12. For example, the cylinders 12 may be defined as cylinder bores within an engine block 13 of the engine 10. Each of the plurality of cylinders 12 includes a combustion chamber 14. Each combustion chamber 14 may have a generally cylindrical shape, in accordance with the general shape of the cylinder 12.

Figure 2:
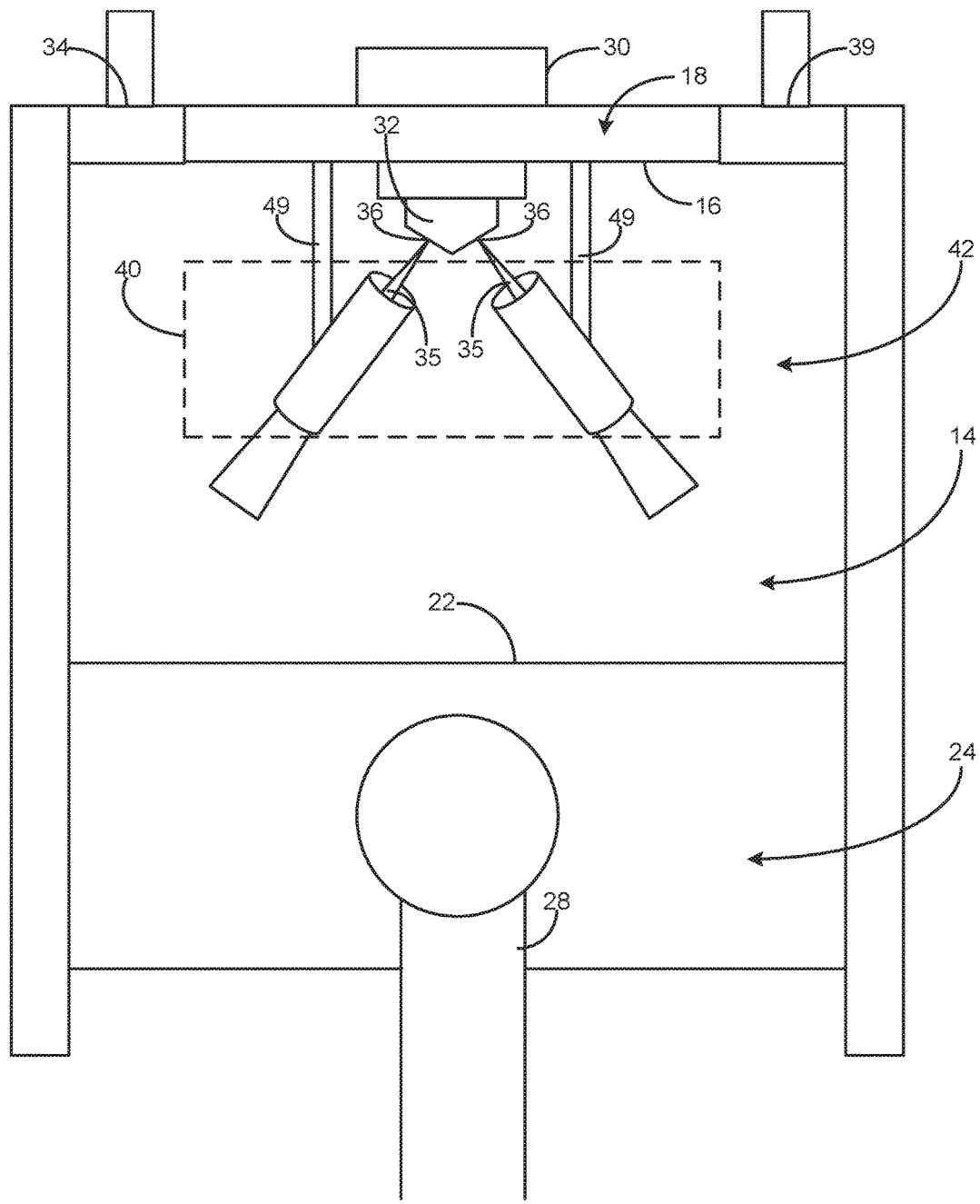
FIG. 2 is a front, cross-sectional view of a cylinder of the internal combustion engine of FIG. 1, as shown taken from the reference notation "A" of FIG. 1, in accordance with the present disclosure.

The combustion chamber 14 is shown in greater detail in the front, cross-sectional view of FIG. 2. As shown in FIG. 2, and with continued reference to FIG. 1, the combustion chamber 14 may be bound at one end by a flame deck surface 16 of a cylinder head 18 of each cylinder 12. The combustion chamber 14 may be further bound at a second end by a piston top surface 22 of a piston 24. The piston 24 is reciprocally disposed within the bore and, as shown in FIG. 1, is connected to a crankshaft 26 via a connecting rod 28. A fuel injector 30 is in fluid connection with the combustion chamber 14 and may be mounted in the cylinder head 18. The fuel injector 30 includes a tip 32 that protrudes within the combustion chamber 14 through the flame deck surface 16. Therefore, the fuel injector 30, via the tip 32, can directly inject fuel into the combustion chamber 14 as, for example, one or more fuel jets.

During operation of the engine 10, air enters the combustion chamber 14 via one or more intake valves 34 (shown in FIG. 2). Air is able to enter the combustion chamber 14 when the air intake valves 34 are open, generally, during an intake stroke and/or at the end of an exhaust stroke and/or at the beginning of a compression stroke. When air is present in the combustion chamber 14, the fuel injector 30, via the tip 32, will inject high pressure fuel through orifices 36 of the tip 32 as fuel jets 35. The fuel jets 35 may generally disperse within the combustion chamber 14 to create a fuel/air mixture within the combustion chamber 14. Ignition produces combustion, which, in turn, provides work on the piston 24 to produce motion upon the crankshaft 26 to drive an output 38. Following combustion, exhaust gas may be expelled from the combustion chamber 14 via one or more exhaust valves 39, when said exhaust valves 39 are open during an exhaust stroke and/or at the end of a power stroke and/or at the beginning of an intake stroke of the engine 10.

Within the combustion chamber 14, uniformity of the fuel/air mixture may be relevant to the combustion efficiency and may be relevant to the amount and type of combustion byproducts that are formed. For example, if the fuel/air mixture is too rich in fuel due to insufficient mixing within the fuel jets 35, then higher soot emissions may occur within the combustion chamber 14 and/or combustion efficiency may be affected. However, using one or more tubular ducts 40 disposed within the combustion chamber 14 may provide for more uniform fuel/air mixing within the fuel jets 35. By using one or more tubular ducts 40, a lift-off length of a flame associated with a fuel jet 35 may be altered (extended or reduced) to achieve an optimized lift-off length. The one or more ducts 40 may alter lift-off length due to energy exchange between the one or more ducts 40 and the fuel/air mixture of the fuel jet 35, due to altering fluid dynamics of the fuel/air mixture of the fuel jet 35, and/or due to prevention of lift-off length recession by acting as a flame arrester.

The one or more ducts 40 may be disposed within a flame region 42 of the combustion chamber 14. The flame region 42 may be defined as a region of the combustion chamber 14 extending from the flame deck surface 16 to the piston top surface 22, when the piston 24 is at or close to a maximum compression distance or top dead center (TDC) position.

Figure 3:
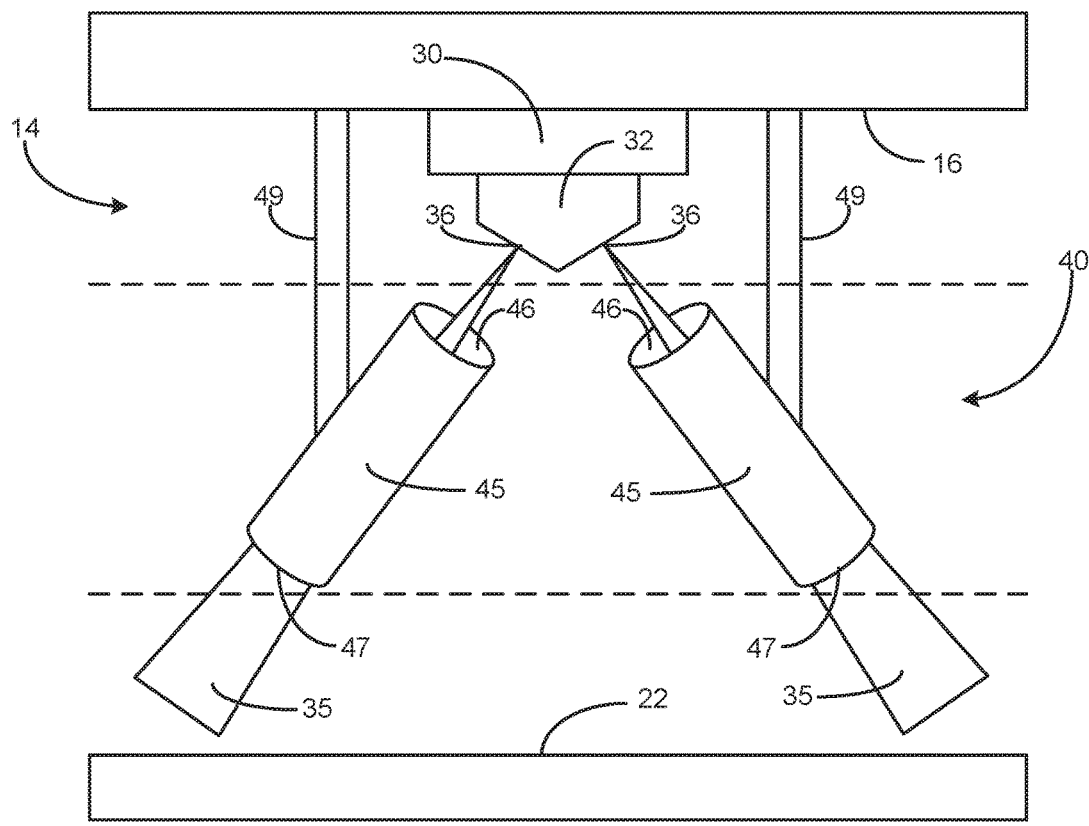
FIG. 3 is a side view of generally tubular ducts for use within the cylinder(s) of FIGS. 1 and 2, in accordance with an embodiment of the disclosure.
Figure 4:
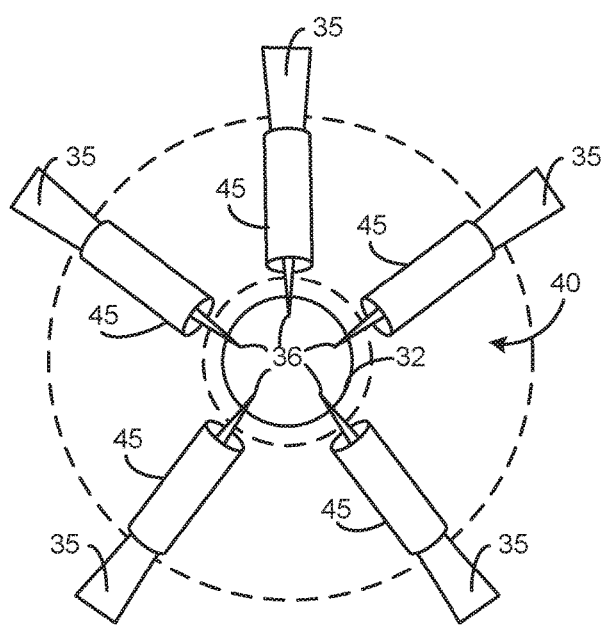
FIG. 4 is a top view of the generally tubular ducts of the embodiment of FIG. 3, shown from above the ducts and an associated fuel injector, in accordance with the embodiment of FIG. 3 and the present disclosure.

To further illustrate the one or more tubular ducts 40 and their interaction with one or more fuel jets 35 injected from the one or more orifices 36 of the tip 32 of the fuel injector 30, the tubular ducts 40, within the combustion chamber 14, are shown in greater detail in FIGS. 3 and 4. The one or more tubular ducts may be generally tubular shaped structures 45, as shown. Upon being injected out of the one or more orifices 36, the fuel jets 35 may, at least partially, enter the ducts 40 at duct openings 46 and may flow through the ducts 40 to duct outlets 47. In some examples, the tubular ducts 40 may be positioned and/or supported within the combustion chamber 14 by a support structure 49. The support structure 49 may be any mounting, wiring, or other positioning device suitable for positioning the ducts 40 within the combustion chamber 14.

Use of the tubular ducts 40 may provide improved mixing of a fuel/air mixture within the fuel jets 35. The tubular ducts 40 may direct combustion away from the fuel injector 30, such that longer flame lift-off lengths may be achieved. Further, by channeling the fuel jets 35 into the tubular ducts 40, entrainment of combustion products from downstream regions of the same or neighboring fuel jets 35 may be inhibited or reduced. By using such tubular ducts 40, levels of soot within the combustion chamber 14 may be reduced greatly.

Figure 5:
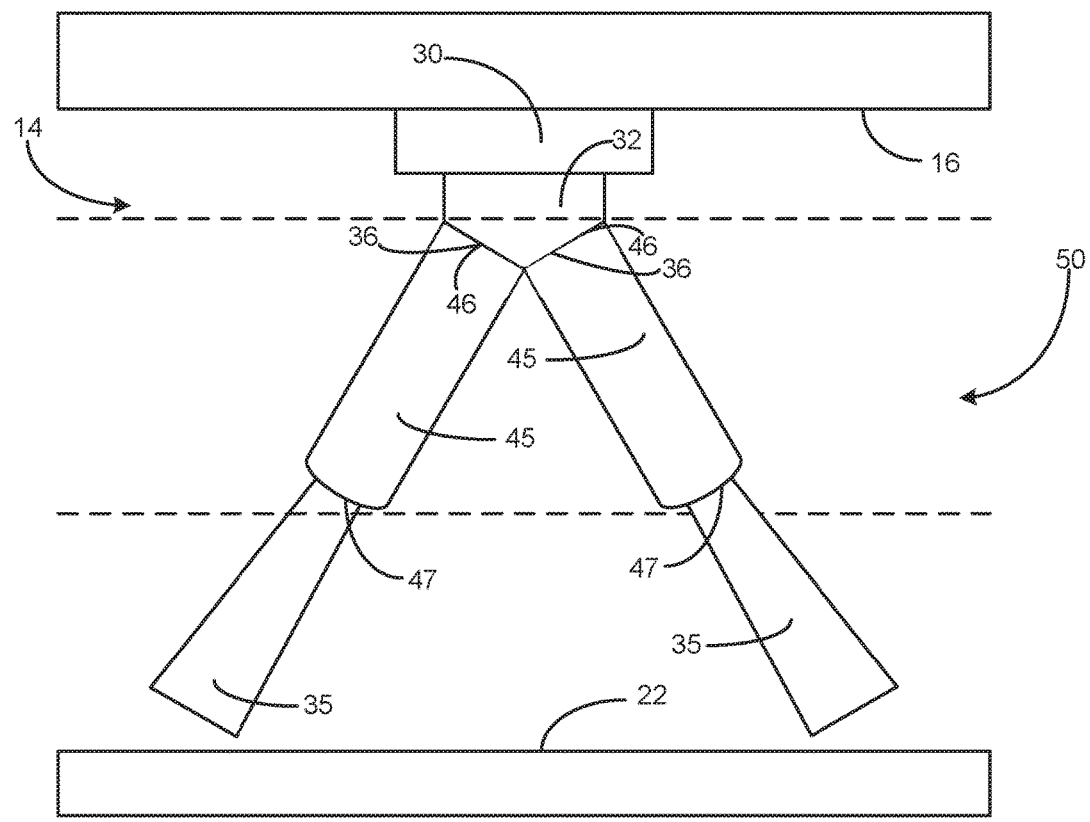
FIG. 5 is a side view of generally tubular ducts, disposed proximate to orifices on a fuel injector, for use within the cylinder(s) of FIGS. 1 and 2, in accordance with another embodiment of the disclosure.
Figure 6:
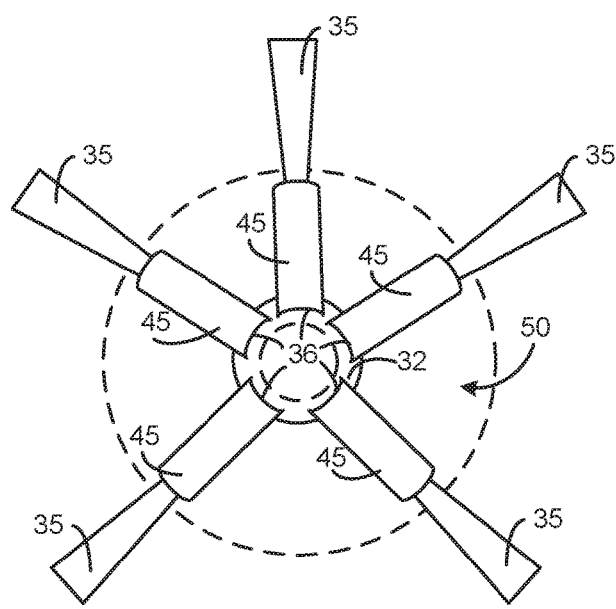
FIG. 6 is a top view of the generally tubular ducts of the embodiment of FIG. 5, shown from above the ducts and the associated fuel injector, in accordance with the embodiment of FIG. 5 and the present disclosure.

In some examples, such as the one or more tubular ducts 50 shown in FIGS. 5 and 6, the tubular ducts 50 may be positioned with the openings 46 directly aligned with and/or directly flush with the orifices 36. In such examples, the support structure 49 may not be necessary. Having the ducts 50 abutting the orifices 36 is another way of achieving ducted combustion, but may require slots, mesh, perforations, or porous media as shown in FIGS. 7-14.

Figure 7:
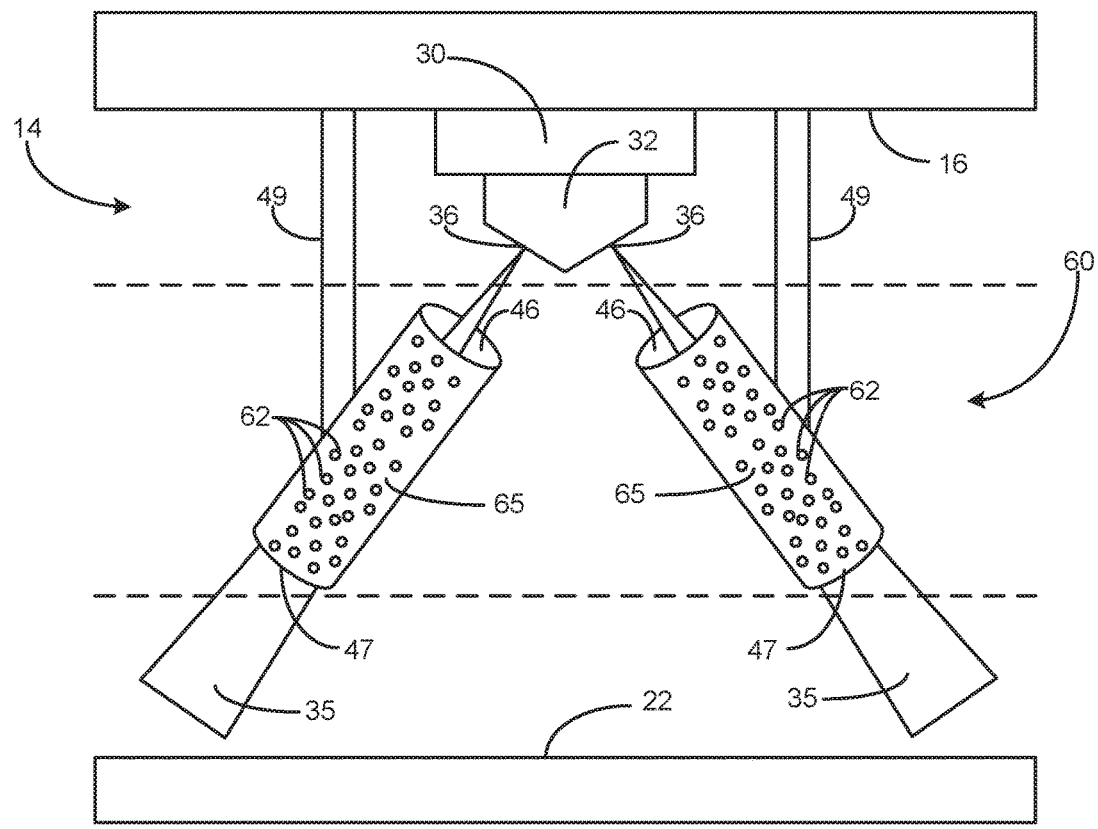
FIG. 7 is a side view of generally tubular ducts for use within the cylinder(s) of FIGS. 1 and 2, the structure of each of the ducts defining a plurality of perforations, in accordance with an embodiment of the disclosure.
Figure 8:
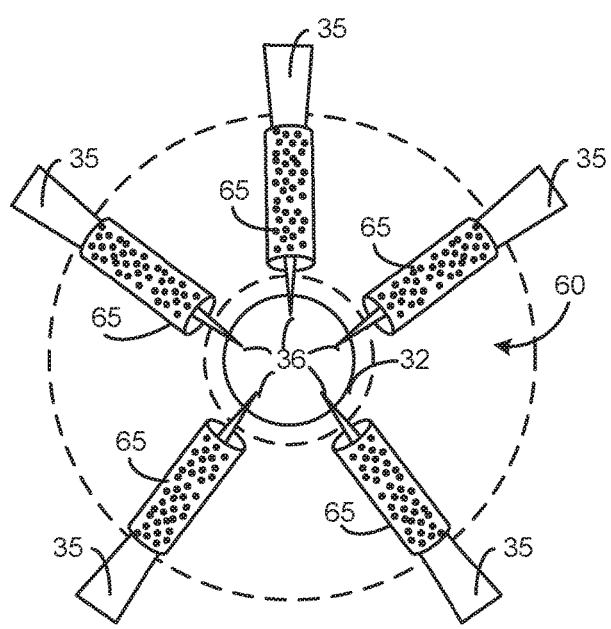
FIG. 8 is a top view of the generally tubular ducts of the embodiment of FIG. 7, shown from above the ducts and an associated fuel injector, in accordance with the embodiment of FIG. 7 and the present disclosure.

The structure of the ducts in a ducted combustion system may include other modifications to alter the fuel/air mixture either within the duct or outside of the duct. For example, FIGS. 7 and 8 show an embodiment of one or more ducts 60 which include a plurality of perforations 62 defined by tubular structures 65. The perforations 62 may allow additional air into the duct when the fuel jets 35 are injected into the openings 46. The additional air provided via the perforations 62 may provide a more uniform and leaner air/fuel mixture within the fuel jets 35, which may, in turn, reduce soot within the combustion chamber 14 during combustion and lower emissions caused by combustion.

Figure 9:
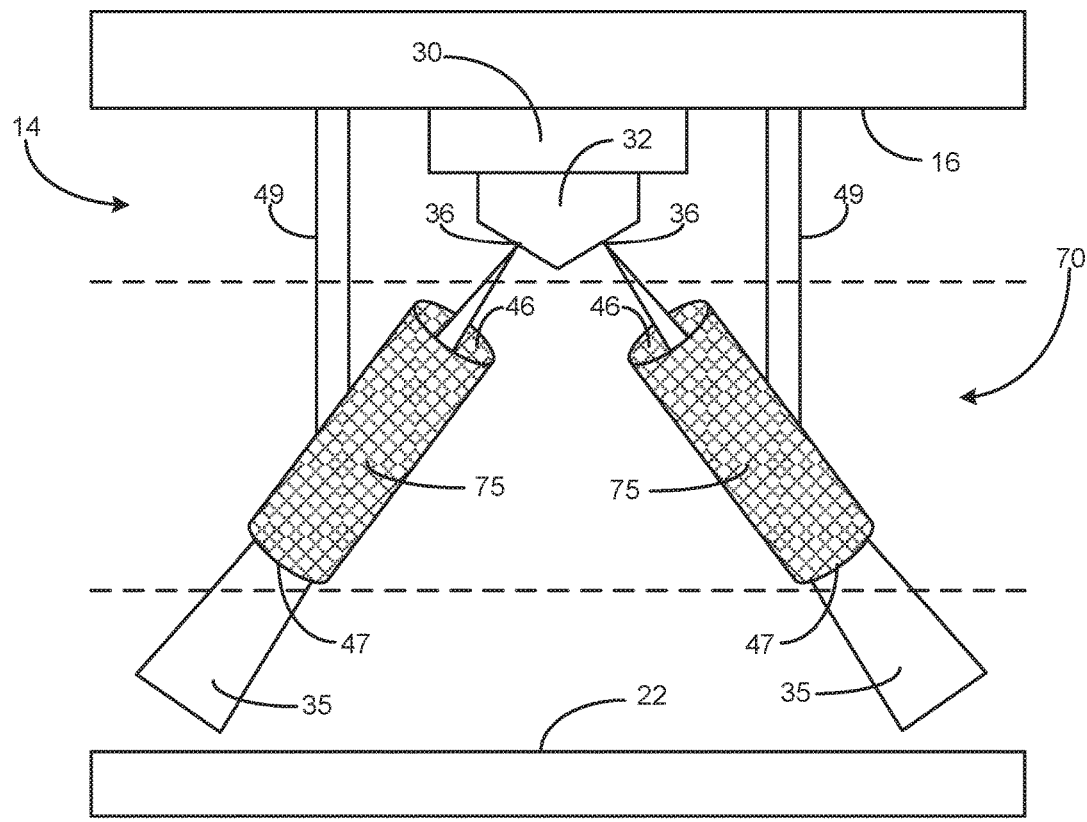
FIG. 9 is a side view of generally tubular ducts for use within the cylinder(s) of FIGS. 1 and 2, the ducts being formed from a mesh material, in accordance with an embodiment of the disclosure.
Figure 10:
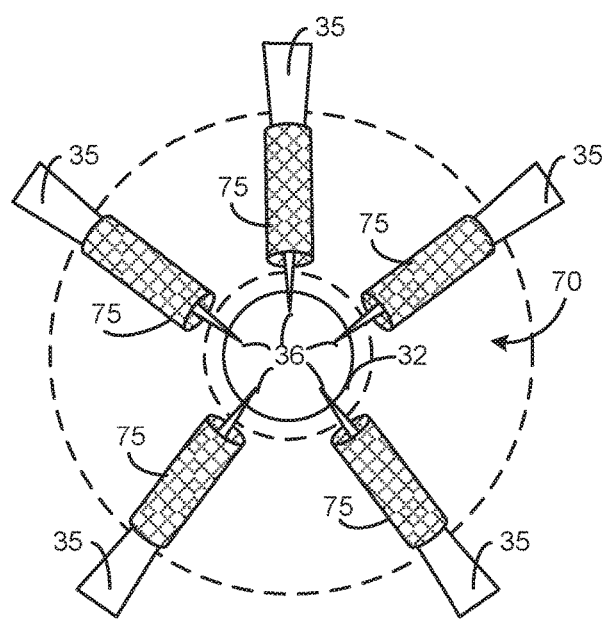
FIG. 10 is a top view of the generally tubular ducts of the embodiment of FIG. 9, shown from above the ducts and an associated fuel injector, in accordance with the embodiment of FIG. 9 and the present disclosure.
Figure 11:
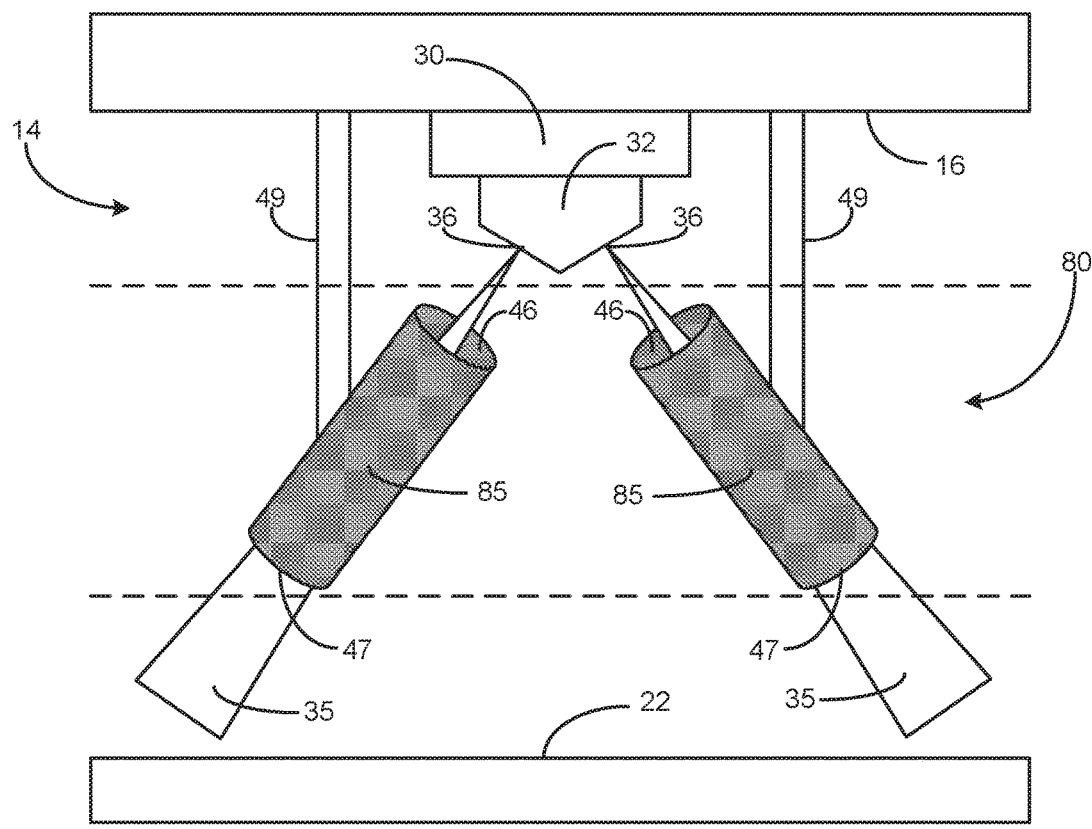
FIG. 11 is a side view of generally tubular ducts for use within the cylinder(s) of FIGS. 1 and 2, the duct being formed from a porous media, in accordance with an embodiment of the disclosure.
Figure 12:
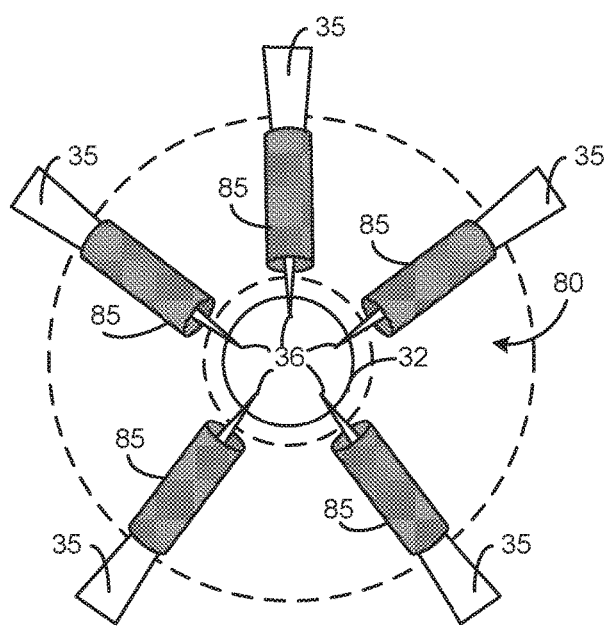
FIG. 12 is a top view of the generally tubular ducts of the embodiment of FIG. 11, shown from above the ducts and an associated fuel injector, in accordance with the embodiment of FIG. 11 and the present disclosure.

To similarly allow additional air into ducts during fuel injection, one or more ducts 70, as shown in FIGS. 9 and 10, may be provided that are formed from a mesh material to create mesh tubular structures 75 for the one or more ducts 70. The mesh tubular structures 75 may allow for airflow to enter the surfaces of the ducts 70 during fuel injection. Alternatively, as shown in FIGS. 11 and 12, one or more ducts 80 may be provided that are formed from a porous media to create porous media tubular structures 85, which may allow for air to enter the surfaces of the ducts 80 during fuel injection. Similar to the perforations 62 of FIGS. 7 and 8, the mesh tubular structures 75 of FIGS. 9 and 10 and/or the porous media tubular structures 85 of FIGS. 11 and 12 may provide for a more uniform and leaner air/fuel mixture within the fuel jets 35, which may, in turn, reduce soot within the combustion chamber 14 during combustion and lower emissions caused by combustion.

Figure 13:
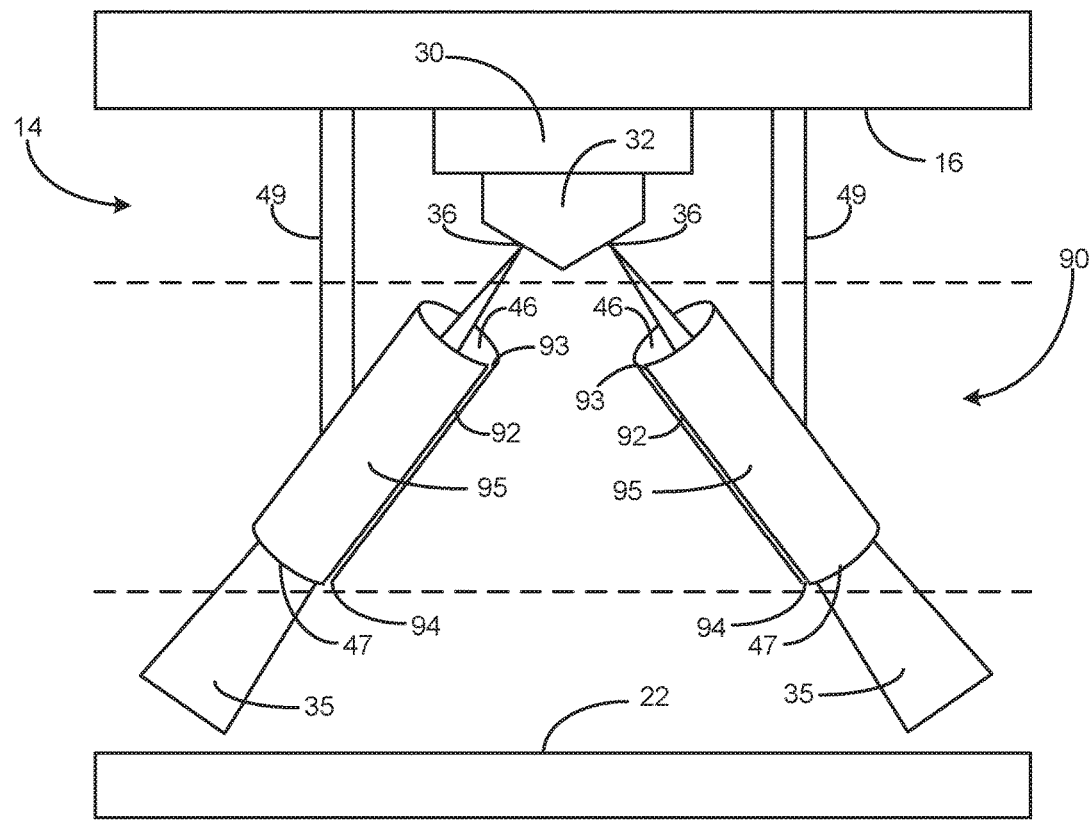
FIG. 13 is a side view of generally tubular ducts for use within the cylinder(s) of FIGS. 1 and 2, the structure of each of the ducts defining a slit, in accordance with an embodiment of the disclosure.
Figure 14:
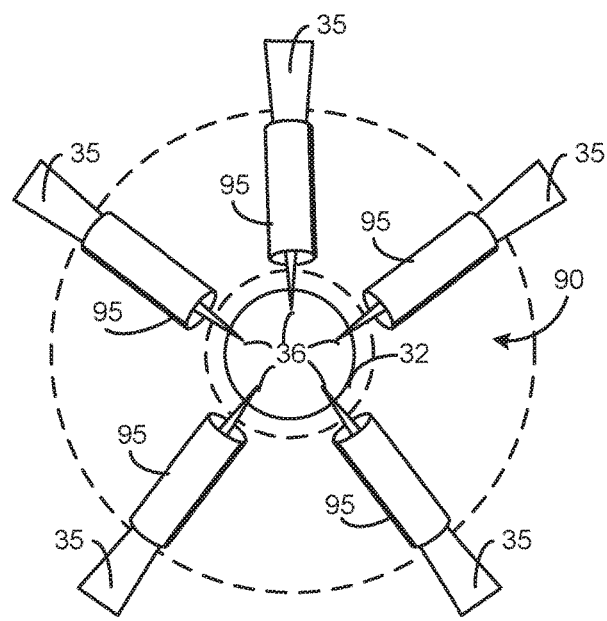
FIG. 14 is a top view of the generally tubular ducts of the embodiment of FIG. 13, shown from above the ducts and an associated fuel injector, in accordance with the embodiment of FIG. 13 and the present disclosure.

For further fuel/air mixing within ducts, the embodiment of FIGS. 13 and 14 includes one or more ducts 90 which include tubular structures 95, each of the tubular structures 95 defining at least one slit 92. While the tubular structures 95 are shown each having one slit 92 extending from first slit ends 93 proximate to the duct openings 46 to second slit ends 94 proximate to the duct outlets 47, slits 92 may be of any length, encompassing any portion of the tubular structures 95. Further, while only one slit 92 is shown on each tubular structure 95, more than one slit 92 having similar or different dimensions are certainly possible. The slits 92 on the tubular structures allow air to enter the sides of ducts during injection; therefore, slits 92 on the tubular structures 95 may provide for a more uniform and/or leaner air/fuel mixture within the fuel jets 35, which may, in turn, reduce soot within the combustion chamber 14 during combustion and may lower emissions caused by combustion, similar to the embodiments described above with reference to FIGS. 5-12.

In some example embodiments of duct structures disclosed herein, the structures of said ducts may converge and/or diverge with respect to an injection axis 98 extending in a flow direction 99. Beginning with the embodiment shown in FIGS. 15 and 16, one or more ducts 100 are shown having divergent tubular structures 105, wherein the divergent tubular structures 105 of the one or more ducts 100 diverge about the injection axis 98 in the flow direction 99. "Diverge about the injection axis in the flow direction," as defined herein with reference to tubular structures, generally refers to a tubular structure having a radius that increases along the length of the tubular structure in the about the injection axis 98 in the flow direction 99. Using divergent tubular structures 105 for the one or more ducts 100 may alter the dispersion of the fuel jets 35, which may have an effect on flame lift-off lengths.

Figure 17:
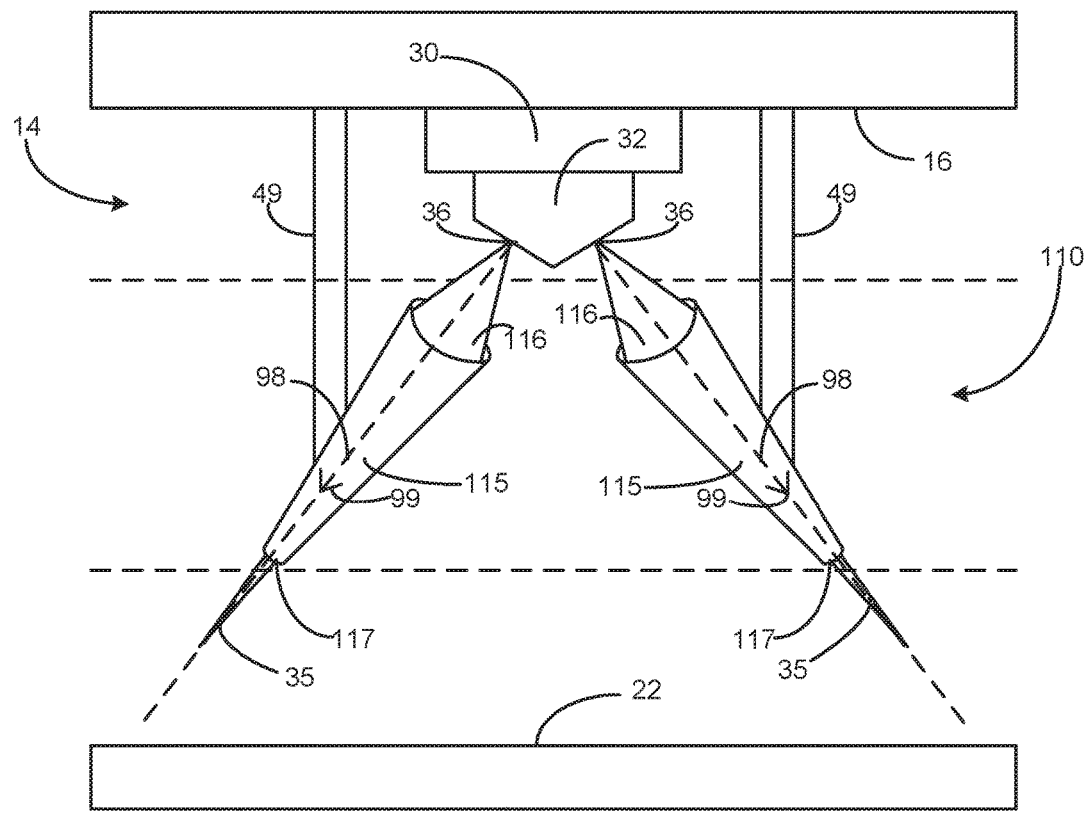
FIG. 17 is a side view of generally tubular ducts for use within the cylinder(s) of FIGS. 1 and 2, the structure of each of the ducts converging in the flow direction of the fuel jets in the cylinder of FIGS. 1 and 2, in accordance with an embodiment of the disclosure.
Figure 18:
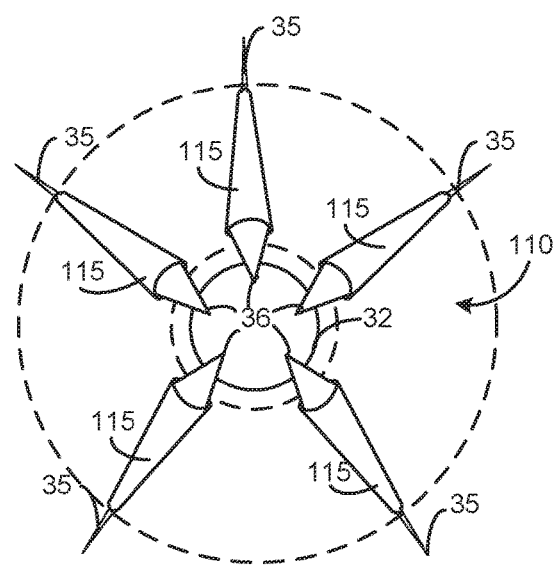
FIG. 18 is a top view of the generally tubular ducts of the embodiment of FIG. 17, shown from above the ducts and an associated fuel injector, in accordance with the embodiment of FIG. 17 and the present disclosure.

Alternatively, as shown in FIGS. 17 and 18, one or more ducts 110 may have convergent tubular structures 115, wherein the convergent tubular structures 115 of the one or more ducts 110 converge about the injection axis 98 in the flow direction 99. "Converge about the injection axis in the flow direction," as defined herein with reference to tubular structures, generally refers to a tubular structure having a radius that decreases along the length of the tubular structure about the injection axis 98 in the flow direction 99. Using convergent tubular structures 115 for the one or more ducts 100 may alter the dispersion of the fuel jets 35, which may have an effect on flame-lift off lengths.

Figure 15:
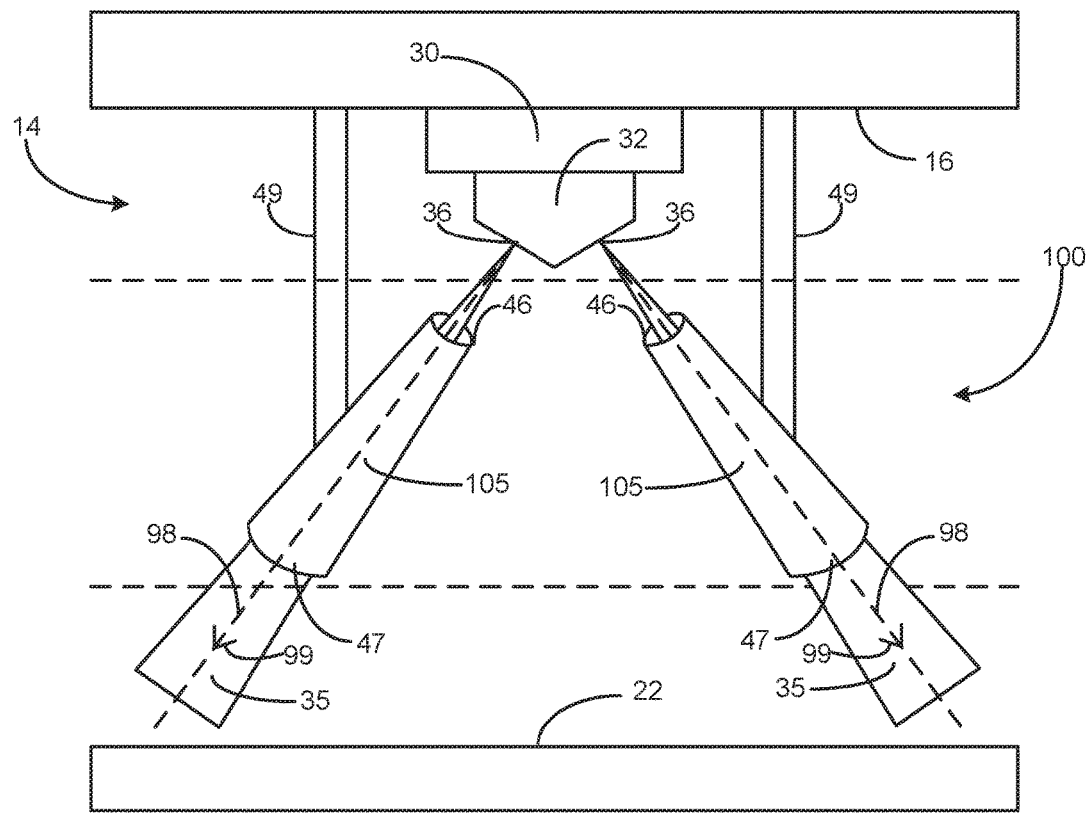
FIG. 15 is a side view of generally tubular ducts for use within the cylinder(s) of FIGS. 1 and 2, the structure of each of the ducts diverging in the flow direction of the fuel jets in the cylinder of FIGS. 1 and 2, in accordance with an embodiment of the disclosure.
Figure 16:
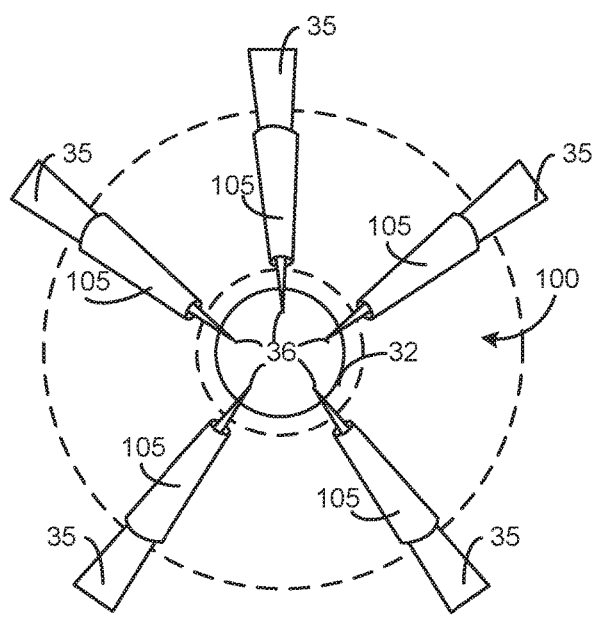
FIG. 16 is a top view of the generally tubular ducts of the embodiment of FIG. 15, shown from above the ducts and an associated fuel injector, in accordance with the embodiment of FIG. 15 and the present disclosure.
Figure 19:
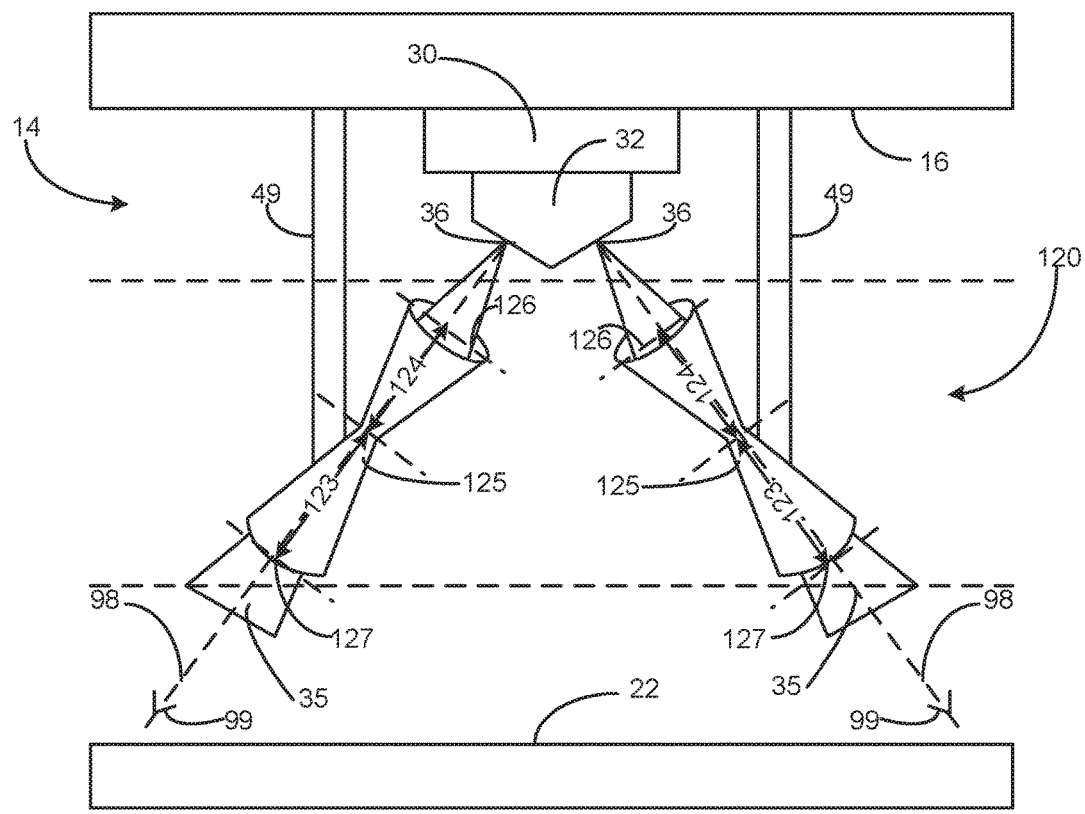
FIG. 19 is a side view of generally tubular ducts for use within the cylinder(s) of FIGS. 1 and 2, the structure of each of the ducts including a portion that converges in the flow direction of the fuel jets in the cylinder of FIGS. 1 and 2 and a portion that diverges in the flow direction of the fuel jets, in accordance with an embodiment of the disclosure.
Figure 20:
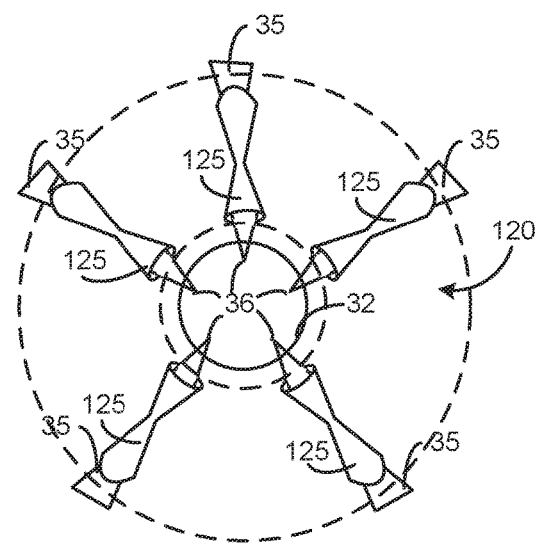
FIG. 20 is a top view of the generally tubular ducts of the embodiment of FIG. 19, shown from above the ducts and an associated fuel injector, in accordance with the embodiment of FIG. 19 and the present disclosure.

Concepts related to the shapes of the divergent tubular structures 105 of FIGS. 15-16 and the convergent tubular structures 115 FIGS. 17-18 may be used in conjunction, resulting in structures having different regions wherein the shape of a tubular structure converges and/or diverges about the injection axis 98 in the flow direction 99. For example, FIGS. 19 and 20 show one or more ducts 120, the ducts having tubular structures 125 that include convergent regions 124 and divergent regions 123. As shown in FIGS. 19 and 20, the convergent regions 124 converge about the injection axis 98 in the flow direction 99, whereas the divergent regions 123 diverge about the injection axis 98 in the flow direction 99. The fuel jets 35 enter the tubular structure 125 at an opening 126, which is associated with the convergent region 124, and exits the tubular structure at an outlet 127, which is associated with the divergent region.

Figure 21:
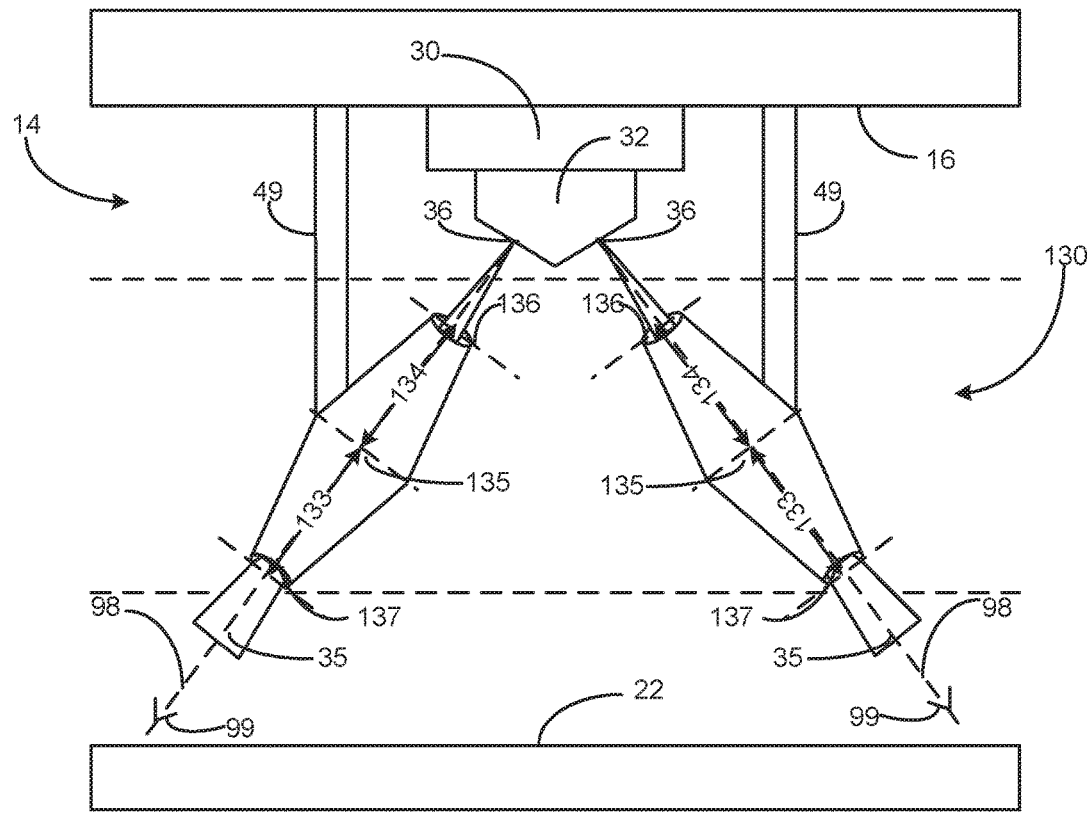
FIG. 21 is a side view of generally tubular ducts for use within the cylinder(s) of FIGS. 1 and 2, the structure of each of the ducts including a portion that diverges in the flow direction of the fuel jets in the cylinder of FIGS. 1 and 2 and a portion that converges in the flow direction of the fuel jets, in accordance with another embodiment of the disclosure.
Figure 22:
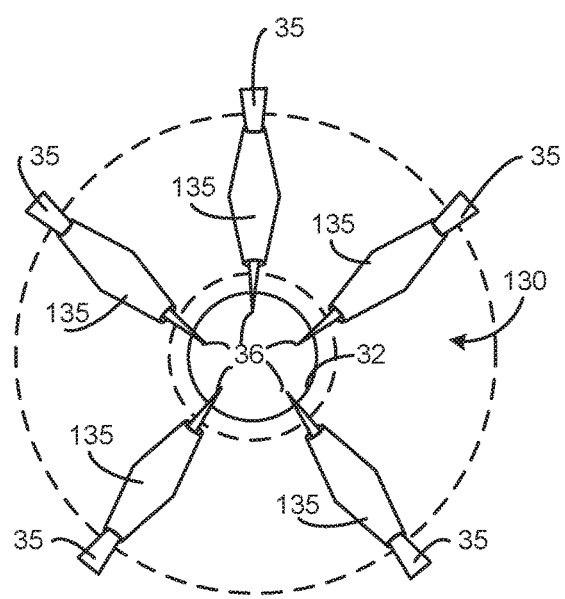
FIG. 22 is a top view of the generally tubular ducts of the embodiment of FIG. 21, shown from above the ducts and an associated fuel injector, in accordance with the embodiment of FIG. 21 and the present disclosure.

Alternatively, as shown in FIGS. 21 and 22, the fuel jets 35 may enter one or more ducts 130, having tubular structures 135, at an opening 136 associated with diverging portions 134 of the tubular structures 135. The fuel jets 35 may continue through the diverging portions 134 of the tubular structures 135 to converging portions 133 until exiting the converging portions 133 at outlets 137. The structures of FIGS. 19-22 may provide for improved mixing of fuel/air mixtures. The converging and/or diverging shape may affect fuel distribution at the outlet of a duct.

Figure 23:
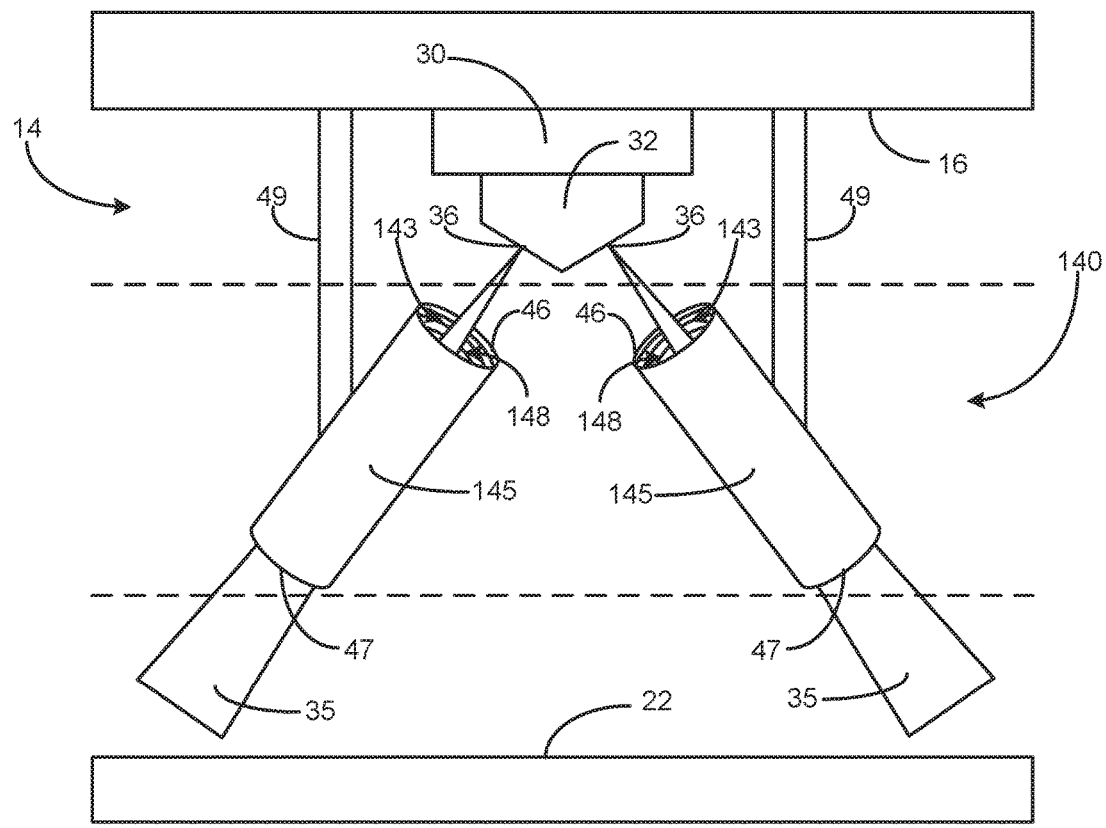
FIG. 23 is a side view of generally tubular ducts for use within the cylinder(s) of FIGS. 1 and 2, the ducts each including a plurality of chambers, in accordance with an embodiment of the disclosure.
Figure 24:
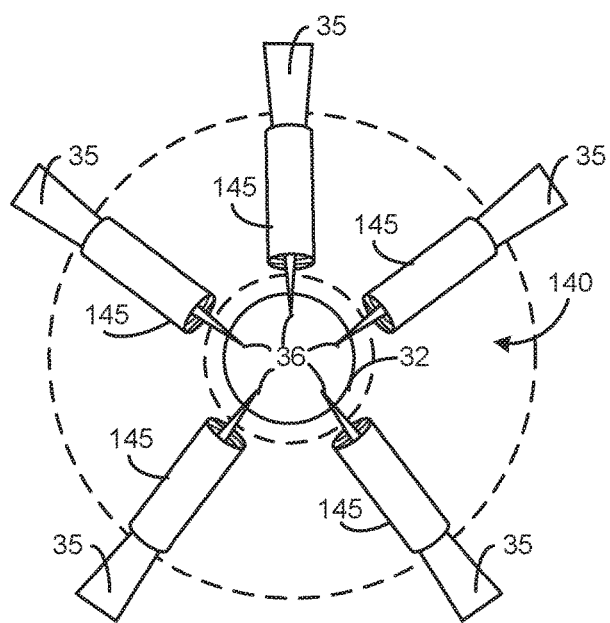
FIG. 24 is a top view of the generally tubular ducts of the embodiment of FIG. 23, shown from above the ducts and an associated fuel injector, in accordance with the embodiment of FIG. 23 and the present disclosure.
Figure 25:
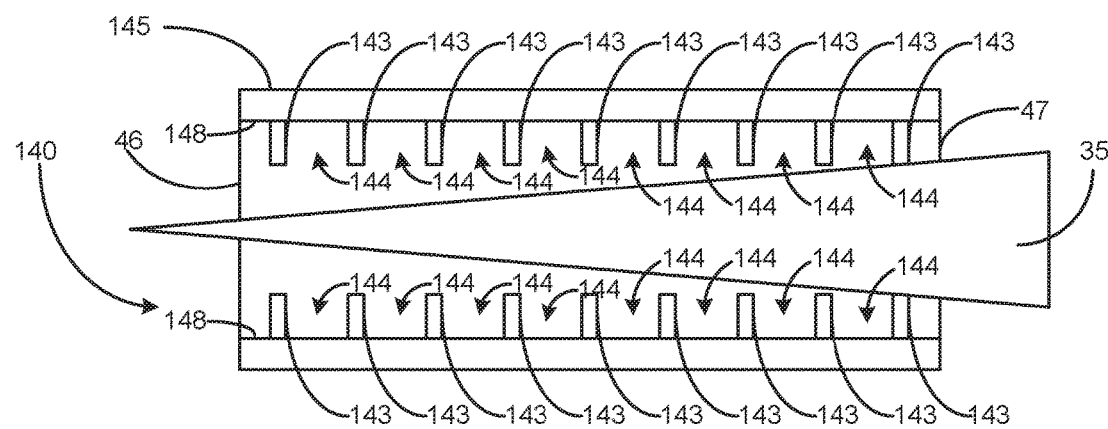
FIG. 25 is a side, cross-sectional view of one of the ducts of FIGS. 23 and 24, showing the plurality of chambers, in accordance with the embodiment of FIGS. 23-24 and the present disclosure.
Figure 26:
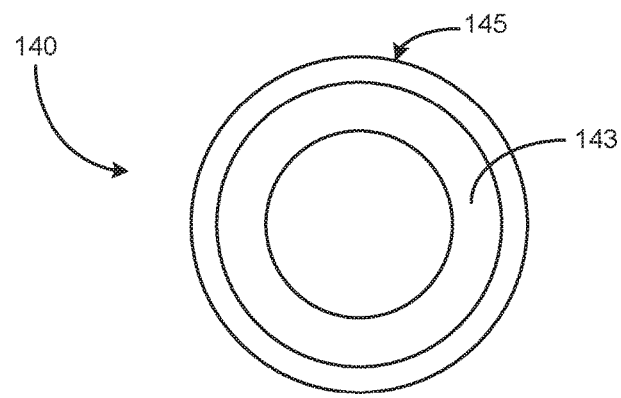
FIG. 26 is a front cross-sectional view of the duct of FIG. 25, as viewed from the reference notation "B," in accordance with the embodiment of FIGS. 23-25 and the present disclosure.

Turning now to FIGS. 23-24, an embodiment of the combustion chamber 14 is shown wherein one or more ducts 140 include pluralities of ring structures 143 protruding from interior surfaces 148 of generally tubular structures 145 of the one or more ducts 140. FIG. 25 shows a cross-sectional view of one of the ducts 140 in a side view and FIG. 26 shows a cross-sectional view of one of the ducts 140 as shown from the opening 46. The pluralities of ring structures 143 may form a plurality of air chambers 144, as best shown in the cross-sectional view of one of the one or more ducts 140 of in FIG. 25. The air chambers 144 may allow more air to entrain the fuel jets 35 as they travel through the ducts 140. Air is "stored" within the chambers 144, prior to injection of the fuel jets 35, and can be entrained into the fuel jets 35 as they pass through the one or more ducts 140. Use of such ducts 140 having air chambers 144 may lean out fuel/air mixtures within fuel jets 35, thereby aiding in reducing soot formation within the combustion chamber 14.

Figure 27:
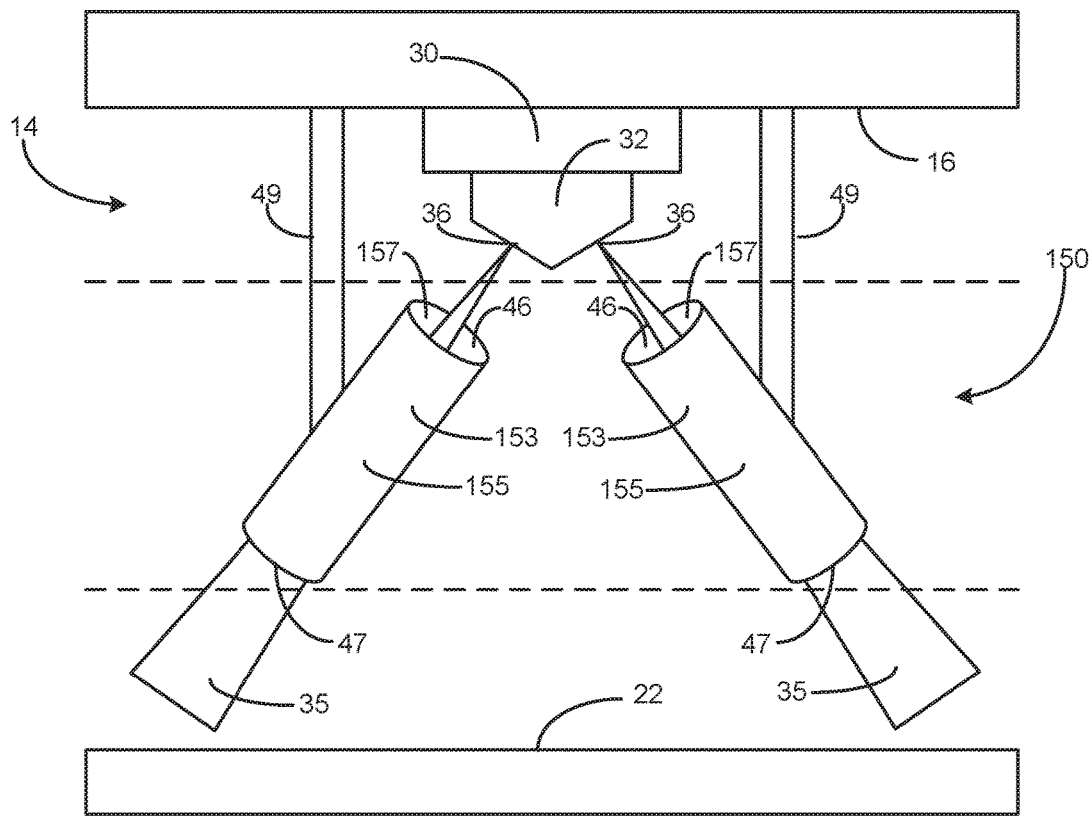
FIG. 27 is a side view of generally tubular ducts for use within the cylinder(s) of FIGS. 1 and 2, the ducts each including a coating, in accordance with an embodiment of the disclosure.
Figure 28:
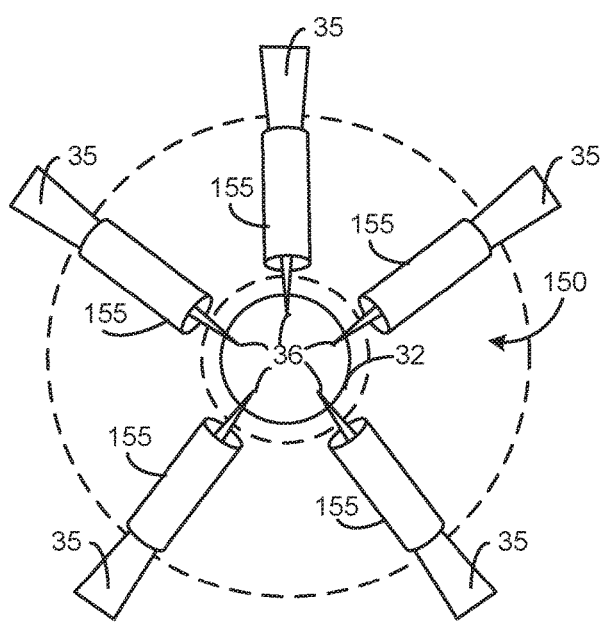
FIG. 28 is a top view of the generally tubular ducts of the embodiment of FIG. 27, shown from above the ducts and an associated fuel injector, in accordance with the embodiment of FIG. 27 and the present disclosure.

FIGS. 27 and 28 illustrate yet another embodiment of one or more ducts 150 disposed within the combustion chamber 14. The one or more ducts 150 of the embodiment of FIGS. 27 and 28 may include outer coating 153 and/or inner coating 157 on outer and/or inner surfaces, respectively, of the generally tubular structures 155 of the one or more ducts 150. The coatings 153, 157 may be any materials applied to the surfaces of the tubular structures 155 to improve one or more of durability, heat transfer properties, surface finish, and/or catalysis. To improve durability, the coatings 153, 157 may be coatings that inhibit thermal degradation or corrosion from hot combustion products. For heat transfer applications, the coatings 153, 157 may be coatings which promote heat transfer and aid in amplifying effects of the one or more ducts 150. In some examples, the coatings 153, 157 may have catalytic properties that enable catalytic reactions, such as, for example, hydrocarbon oxidation to enhance combustion, such as, for example, platinum, palladium, and the like. Some catalysis coatings may provide self-cleaning surfaces that can prevent deposit build up. Further, the coatings 153, 157 may provide a surface finish which may change the base material surface finish of the one or more ducts 150 to enable different fluid mechanics regarding the fuel jet 35 interaction with the ducts 150. While coatings having the aforementioned characteristics are detailed, they are only exemplary and any coatings that would advantageously alter characteristics of the one or more ducts 150 are certainly possible.

Figure 29:
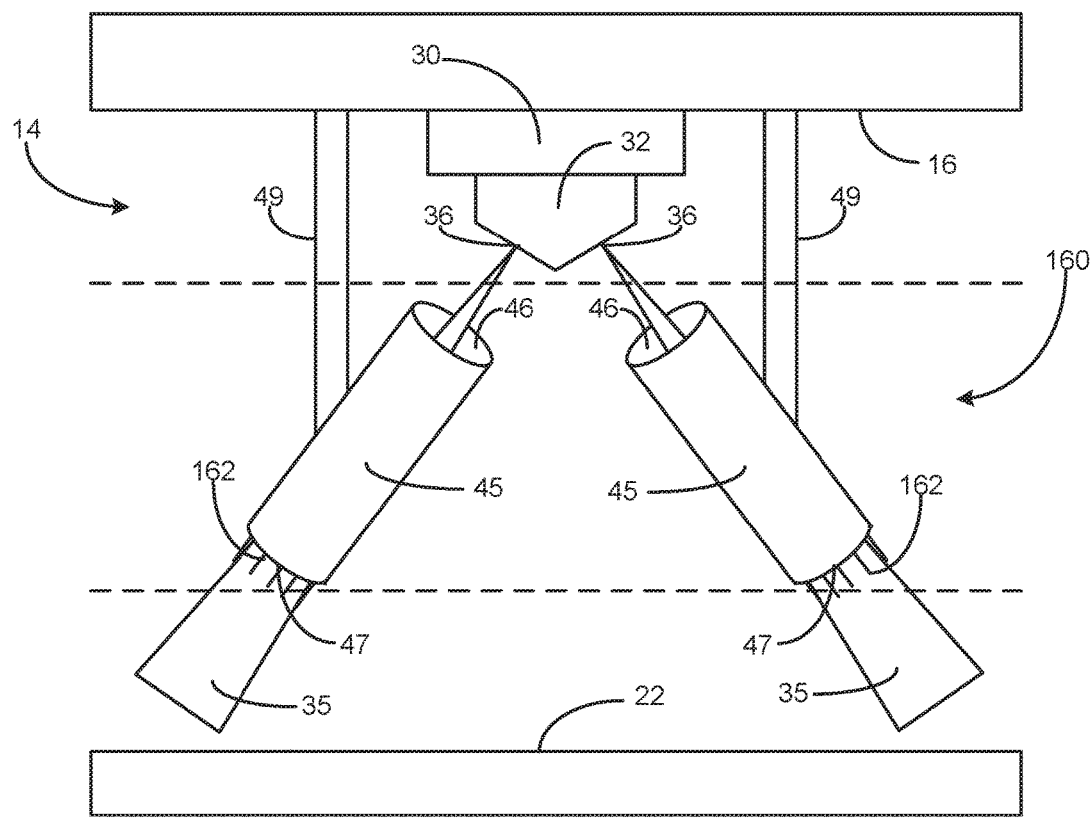
FIG. 29 is a side view of generally tubular ducts for use within the cylinder(s) of FIGS. 1 and 2, the ducts each including a flame arrester, in accordance with an embodiment of the disclosure.
Figure 30:
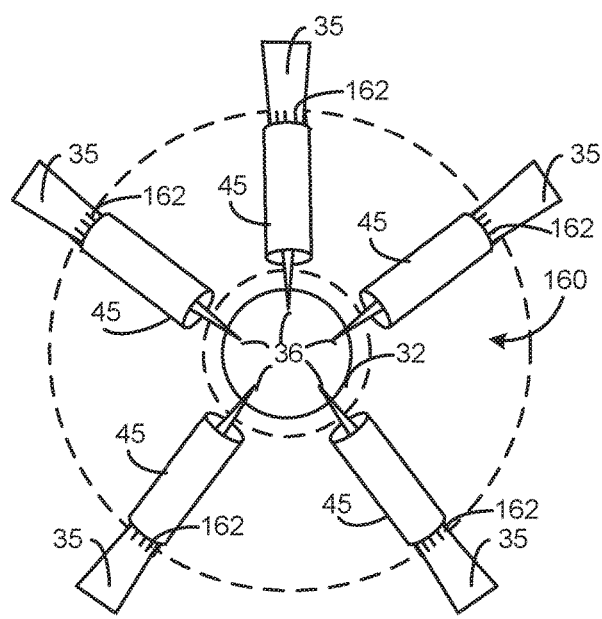
FIG. 30 is a top view of the generally tubular ducts of the embodiment of FIG. 29, shown from above the ducts and an associated fuel injector, in accordance with the embodiment of FIG. 29 and the present disclosure.
Figure 31:
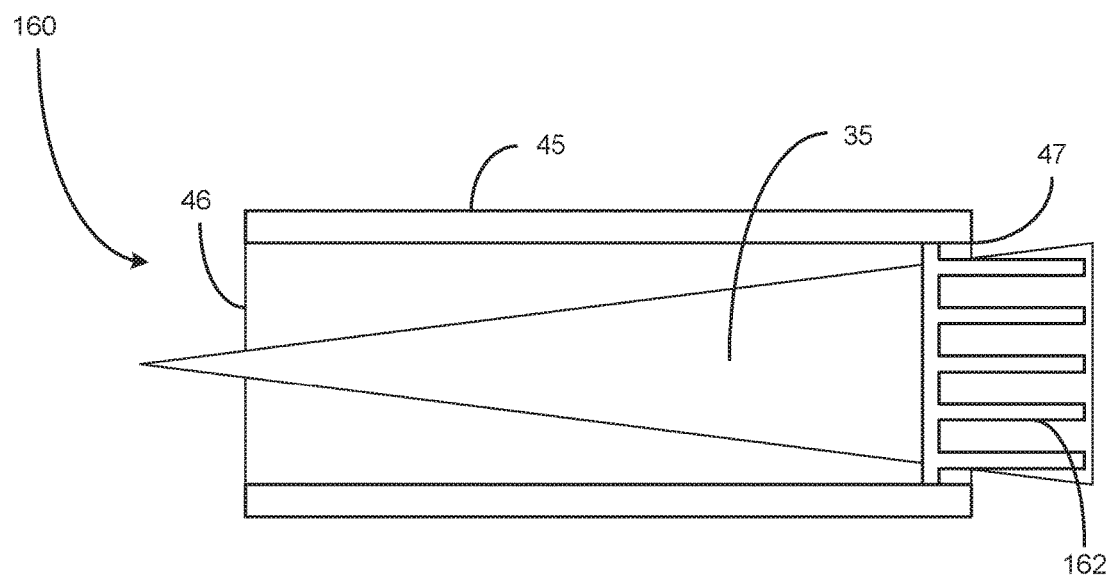
FIG. 31 is a side, cross-sectional view of one of the ducts of FIGS. 29 and 30, showing a flame arrester, in accordance with the embodiment of FIGS. 29-30 and the present disclosure.

The aforementioned ducted combustion systems can drastically reduce soot emissions when flame lift-off lengths are extended due to the ducts. However, under certain circumstances, a flame may exist inside the ducts during combustion. An embodiment of one or more ducts 160, each including a flame arrester 162, is shown in FIGS. 29 and 30. The one or more ducts 160 have the generally tubular shaped structures 45 and have the flame arrester 162 disposed proximate to the outlet 47 of the duct 160. As shown in greater detail in the cross-sectional view of one of the one or more ducts 160 in FIG. 31, the flame arrester 162 may extend partially inside of the duct 160, yet proximate to the outlet 47. The flame arrester may prevent a flame from existing within the duct 160.

The flame arresters 162 may be any device that prevents a flame from existing inside the ducts 160 in the proximity of the outlet 47. Therefore, the flame arresters 162 may be devices that absorb energy from a flame, when the flame exists at the outlet 47 of one of the one or more ducts 160. For example, the flame arrester 162 may be a grid of thin metal plates disposed proximate to the outlet 47. Such thin metal plates may absorb energy from a flame at the outlet 47, thereby reducing or eliminating existence of a flame from an interior of the duct 160 proximate to the outlet 47. Use of metal plates as the flame arrester 162 is merely exemplary and the flame arrester 162 may be made of any material suitable for absorbing energy from a flame at the outlet 47 (e.g., ceramic plates).

Figure 32:
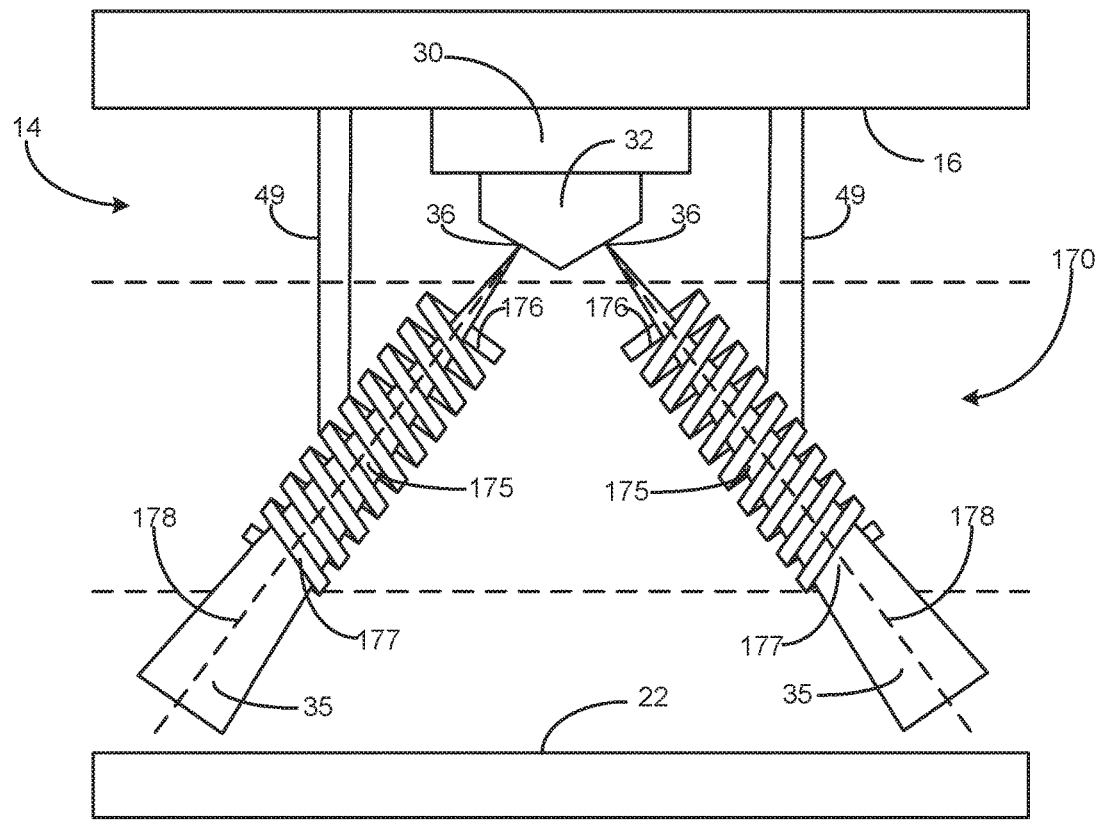
FIG. 32 is a side view of generally tubular ducts for use within the cylinder(s) of FIGS. 1 and 2, each of the ducts having a generally spiral-shaped structure, in accordance with an embodiment of the disclosure.
Figure 33:
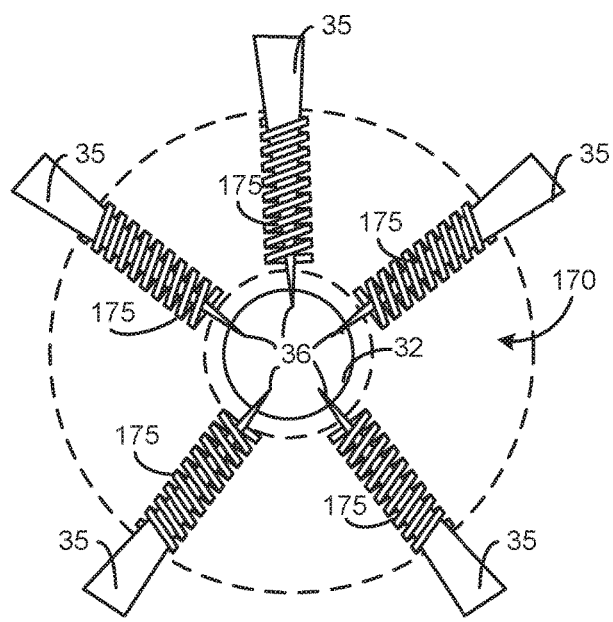
FIG. 33 is a top view of the generally tubular ducts of the embodiment of FIG. 32, shown from above the ducts and an associated fuel injector, in accordance with the embodiment of FIG. 32 and the present disclosure.

In another embodiment shown in FIGS. 32 and 33, one or more ducts 170 are shown having generally spiral-shaped structures 175. The spiral-shaped structures 175, as shown, are formed in the shape of a spiral in a tubular manner about an axis 178. By having spiraled structures 175, the ducts 170 have a continual, circumferential slot for air entrainment within each duct 170. While the slotting defined by the spiraled structures 175 is shown as a uniform slot spiraling about the spiraled structures 175, the circumferential slotting need not be constant and can vary about the structures 175. Such air entrainment may lead to an improved fuel/air mixture within the fuel jets 35, which may reduce soot emissions.

Figure 34:
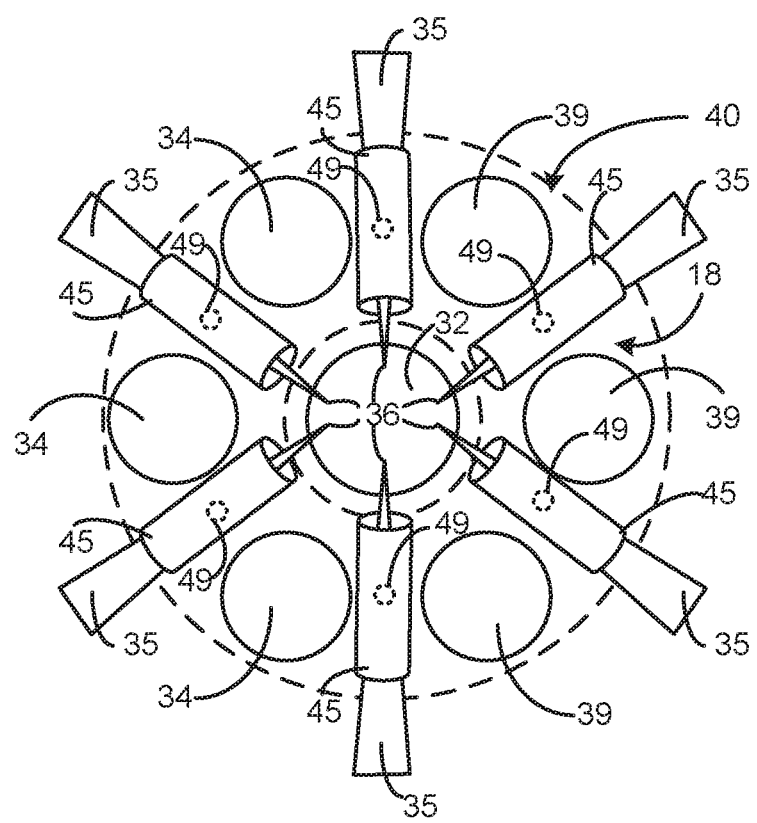
FIG. 34 is a top view of the generally tubular ducts of the embodiment of FIG. 3, shown from above the ducts and an associated fuel injector and showing placement with relation to the intake valves and exhaust valves of FIG. 2, in accordance with the embodiment of FIGS. 2-3 and the present disclosure.

Turning now to FIG. 34 and with continued reference to FIGS. 2 and 3, an example placement configuration of the one or more ducts 40, air intake valves 34, and exhaust valves 39 is shown. As shown in FIG. 2, the air intake valves 34 and exhaust valves 39 are disposed on the cylinder head 18. The configuration of FIG. 34 shows the air intake valves 34 and exhaust valves 39 arranged radially outward, relative to the injector tip 32 and spaced circumferentially about the cylinder head 18. The duct structures 45 of the one or more ducts 40 may be disposed, circumferentially, such that each duct structure 45 is located between two valves 34, 39. In such an arrangement, there may be access for each of the duct structures 45 to be mounted to the head 18 by, for example, the support structure 49 (see, for example, the dashed lines denoting placement of the support structure 49 in FIG. 34). The valves 34, 39 may be circumferentially spaced substantially equidistant from one another; however, any spacing scheme may be used so long as a duct structure 45 may be disposed circumferentially between two valves 34, 39. While six duct structures 45 and six valves 34, 39 are shown, any number of duct structures 45 and valves 34, 39 may be included, such that each duct structure 45 is disposed circumferentially between at least two valves 34, 39.

Figure 35:
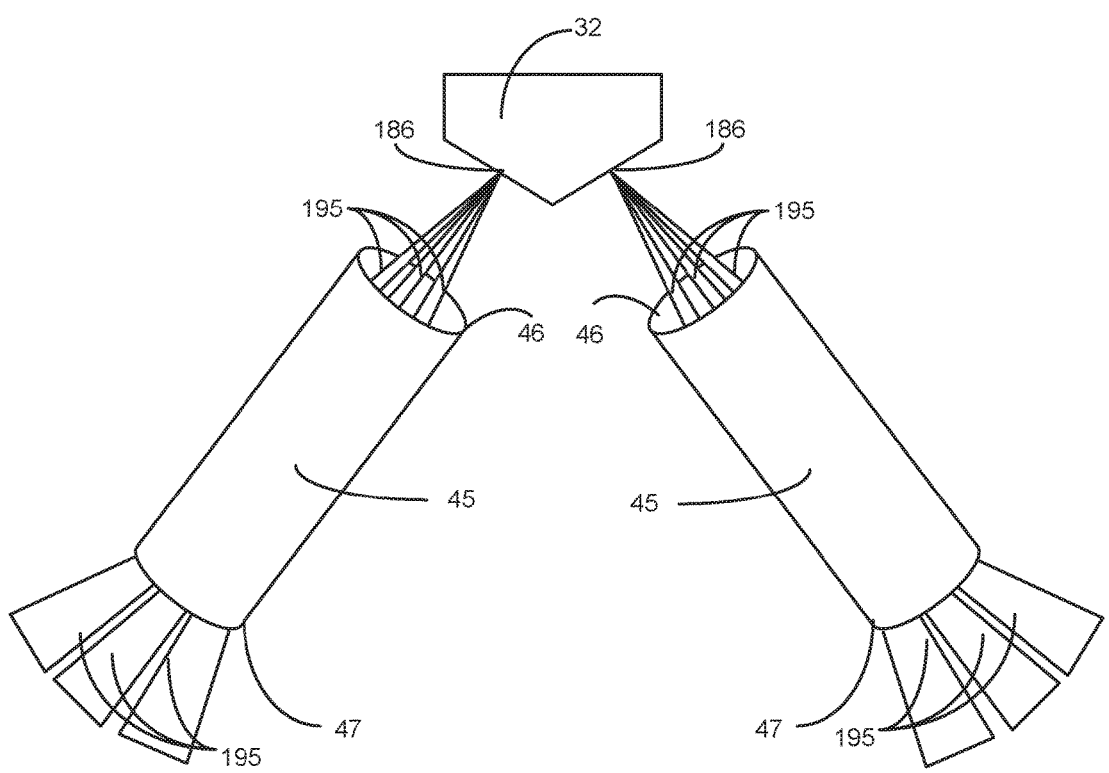
FIG. 35 is a magnified side view of generally tubular ducts and a fuel injector tip, wherein the fuel injector tip includes orifices with grouped holes, in accordance with an embodiment of the present disclosure

FIG. 35 is a magnified side view of duct structures 45, of the one or more ducts 40, and the fuel injector tip 32. In the embodiment of FIG. 35, the fuel injector includes one or more sets of grouped orifices 186. The sets of grouped orifices 186 may be sets of two or more individual orifices that have smaller diameters than conventional orifices and are located in very close proximity to other respective members of said set of orifices, with small offsets therebetween. When the fuel injector 30 injects fuel into the combustion chamber 14, the fuel is injected as a plurality of fuel jets 195 out of each member of each set of grouped orifices 186. While three fuel jets 195 are shown injected out of each orifice 186, any number of fuel jets 195 may be injected out of each orifice 186; the number of fuel jets 195 corresponding to the number of holes orifices included in the set of grouped hole orifices that the fuel jets 195 are injected from. The pluralities of fuel jets 195 may then be directed, at least partially, into the generally tubular shaped duct structures 45.

Sets of grouped orifices 186 may be useful in simulating characteristics of smaller orifices, while still using orifices that are large enough to inject the requisite fuel into the combustion chamber 14. Sets of grouped orifices 186 may further be useful in providing proper fuel dispersion within the combustion chamber 14 and/or may provide optimized fuel/air mixing in one or all of the fuel jets 195 and the combustion chamber 14.

Figure 36:
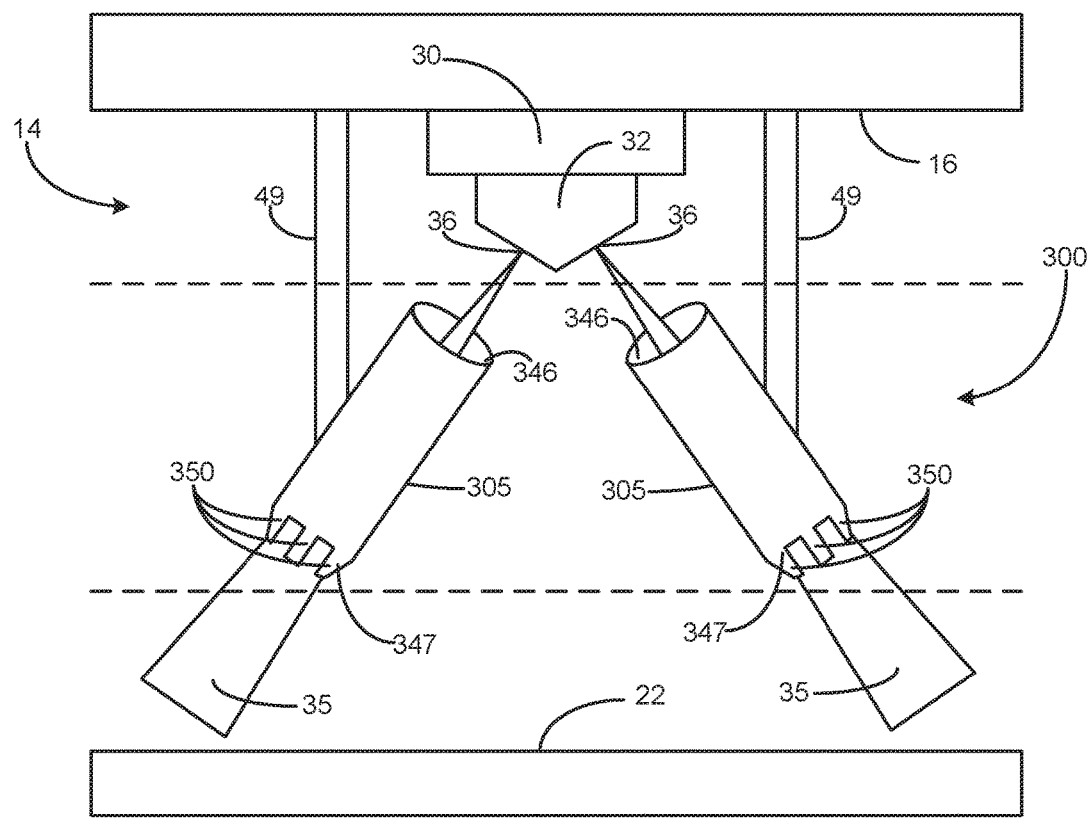
FIG. 36 is a side view of ducts, having one or more structural tabs proximate to duct outlets of the ducts, for use within the cylinder(s) of FIGS. 1 and 2, in accordance with an embodiment of the disclosure.
Figure 37:
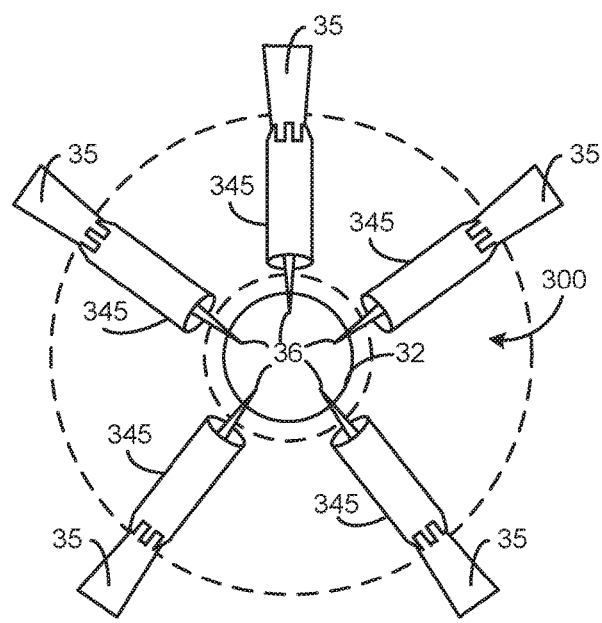
FIG. 37 is a top view of the ducts of the embodiment of FIG. 36, shown from above the ducts and an associated fuel injector, in accordance with the embodiment of FIG. 36 and the present disclosure.

As discussed above, the structure of ducts, within a ducted combustion system, may include further modifications to achieve optimal fuel/air mixtures, which may provide optimal ignition of a flame, within the combustion chamber 14 and relative to a duct. Such structural modifications may include structural tabs proximate to a duct outlet and, optionally, a tapering of said duct outlet. In FIGS. 36 and 37, an embodiment of the combustion chamber 14 is shown, wherein one or more ducts 300 include one or more structural tabs 350 proximate to an outlet 347 of each of the one or more ducts 300. An example duct 305 of the one or more ducts 300 is illustrated in a magnified side view in FIG. 38, detailing further features of both the duct 305 and the duct outlet 347. Such features of the duct outlet 347 are shown, further, in the bottom view of the duct 305 and duct outlet 347 of FIG. 39. Lastly, a cross-sectional side view of the duct 305, illustrating various features thereon, taken from a line A-A of FIG. 39, is shown in FIG. 40. All of FIGS. 36-40 bear like reference numbers relating to like elements. Accordingly, the following description of the one or more ducts 300 and/or the duct 305 is intended to describe features and/or elements of a common embodiment illustrated by all of FIGS. 36-40.

As shown in FIG. 36, one or more ducts 300 are disposed within the combustion chamber 14, which may be utilized for providing more uniform fuel/air mixing, within the fuel jets 35. By using the one or more ducts 300, a lift-off length of a flame associated with a fuel jet 35 may be altered (extended or reduced) to achieve an optimized lift-off length. The one or more ducts 300 may alter lift-off length due to energy exchange between the one or more ducts 300 and the fuel/air mixture of the fuel jet 35, due to altering fluid dynamics of the fuel/air mixture of the fuel jet 35, and/or due to prevention of lift-off length recession by acting as a flame arrestor.

To that end, by utilizing the one or more ducts 300, which each may include one or more structural tabs 350, air entrainment may be provided at the outlet 347 of each of the one or more ducts 300. By providing air entrainment at the outlet 347 of the ducts 300, the structural tabs 350 may inhibit ignition of a flame, upstream of the duct outlet 347, within the ducts 300. By inhibiting flames within the one or more ducts 300, during a cycle of the engine 10, optimal lift off length may be achieved and soot reduction, within the combustion chamber 14, may be achieved.

Returning to FIG. 36, the one or more ducts 300 are illustrated when the one or more fuel jets 35 are injected from the one or more orifices 36 of the tip 32 of the fuel injector 30. The one or more ducts 300 may be of any shape, wherein the ducts include structural tabs 350 proximate to the duct outlet 347, such as, but not limited to a tubular shaped duct, as shown. Upon being injected out of the one or more orifices 36, the fuel jets 35 may, at least partially, enter the ducts 300 at duct openings 346 and flow through the ducts 300 to the duct outlets 347. In some examples, the ducts 300 may be positioned and/or supported within the combustion chamber 14 by the support structure 49.

Figure 38:
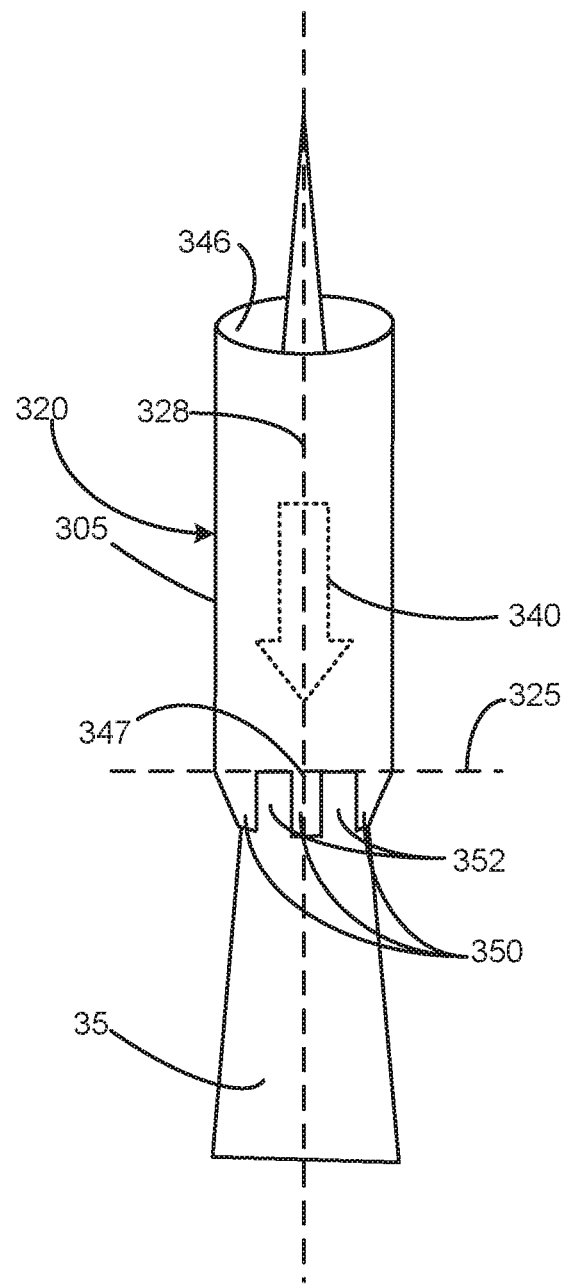
FIG. 38 is a magnified side view of an example duct of the ducts of FIGS. 36 and 37, detailing characteristics of the duct outlet and features thereon, in accordance with FIGS. 36 and 37 and the present disclosure.
Figure 39:
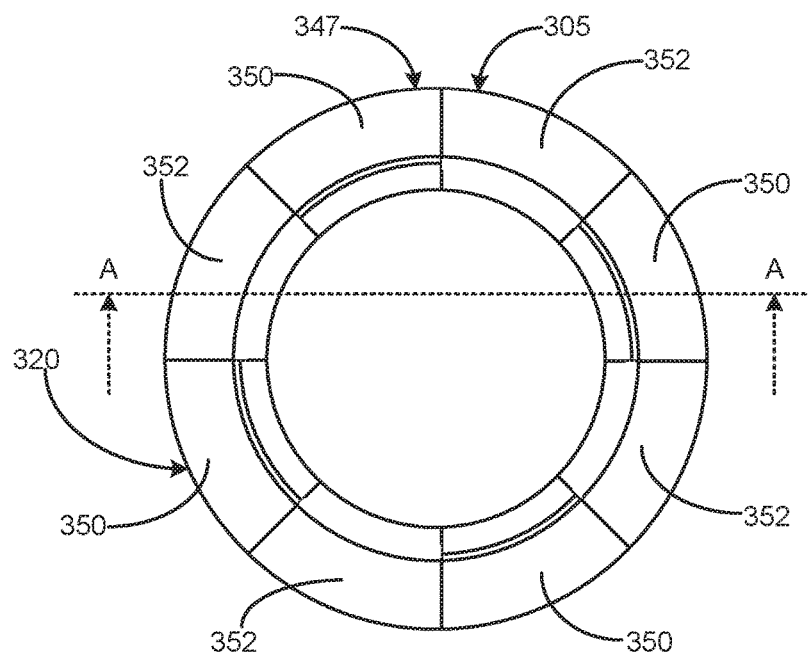
FIG. 39 is bottom view of the duct and duct outlet of FIG. 38 and features thereon, in accordance with FIGS. 36-38 and the present disclosure.
Figure 40:
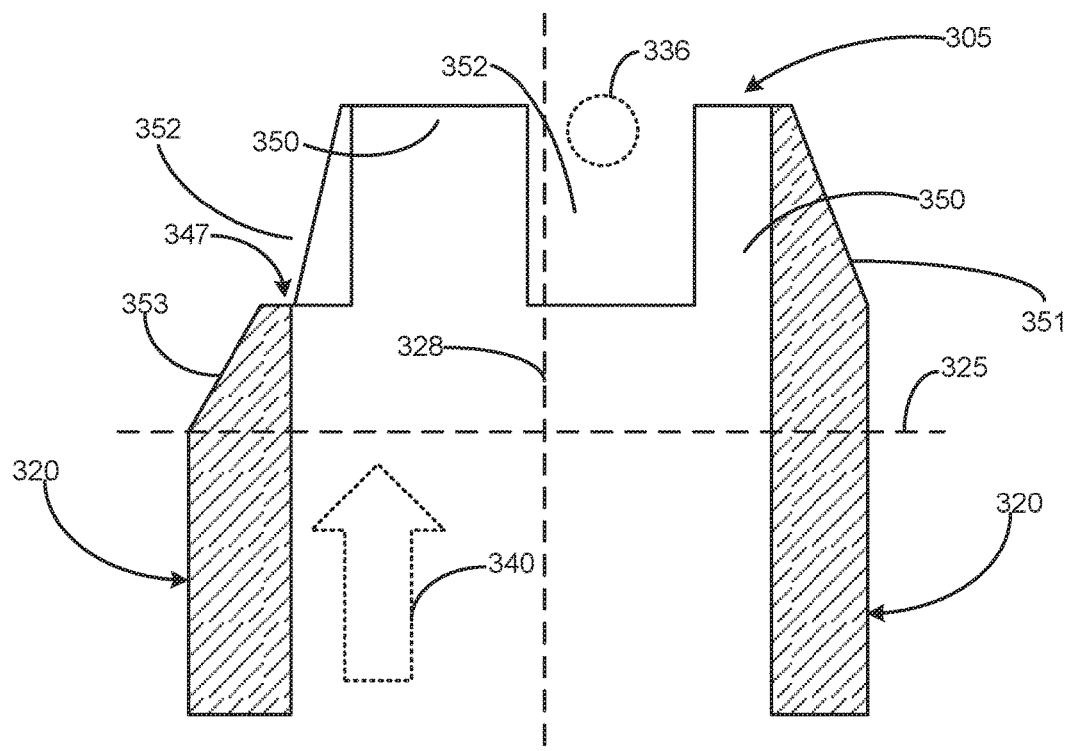
FIG. 40 is a side cross-sectional view of the duct of FIGS. 38 and 39, taken along a line A-A of FIG. 39, in accordance with FIGS. 36-39 and the present disclosure.

Referring now to FIGS. 38-40, and with continued reference to FIGS. 36 and 37, an example duct 305 of the one or more ducts 300 is shown in greater detail. The duct 305 includes the structural tabs 350, which may be defined by the duct 305, proximate to the duct outlet 347, and/or may be an additional structure affixed to the duct 305, proximate to the duct outlet 347. The structural tabs 350 may be arranged about the structure of the duct outlet 347 (e.g., arranged circumferentially about the duct outlet 347, as best shown in bottom view of FIG. 39). With the structural tabs 350 in an arrangement proximate to the duct outlet 347, the duct outlet 347, via inclusion of the structural tabs 350, may then define a plurality of voids arranged about the duct outlet 347 (e.g., arranged circumferentially about the duct outlet 347, as best shown in FIG. 39).

By enabling the existence of the voids 352, air entrainment may be caused at the duct outlet 347. Further, the structural tabs 50 may inhibit ignition at the duct outlet 347, thereby acting as a flame arrester, which may inhibit ignition of the at least one fuel jet 35 upstream, within the duct, of the one or more structural tabs 350. Further, as shown in FIG. 40, a duct outlet ignition region 336 may exist, wherein the duct outlet ignition region 336 is downstream from, the duct outlet 347 and/or the structural tabs 350. Ideally, the duct outlet ignition region 336 will extend as far from the duct outlet 347 as possible; however, in some ignition scenarios, ignition may occur proximate to the duct outlet 347. By entraining the air and avoiding ignition, upstream of the duct outlet ignition region 336, the structural tabs 350 may provide for even greater soot reduction within the combustion chamber 14.

In addition to use of the structural tabs 350, in some examples, the duct outlet 347 may include and/or define a tapered portion 325. In the illustrations of FIGS. 38-40, the tapered portion 325 is defined as any portion of the duct 305 that extends, in the flow direction 340, past the dotted line labeled "325." The tapered portion 325 may be a convergent structure of an outer wall 320 of the duct 305, wherein the tapered portion 325, at least in part, converges about a duct center line 328 in a flow direction 340 of the duct 305. "Converge about the duct center line in a flow direction," as defined herein with reference to the ducts 300, generally refers to a duct structure having a radial width that decreases along the length of the duct, about the centerline 328 and in the flow direction 340. Using the tapered portion 325 may further aid in preventing fuel jet ignition upstream of the duct outlet 347.

In such examples that include the tapered portion 325, one or more of the structural tabs 350 may also be tapered, having a tapered tab 351, as best shown in FIG. 40, converging about the duct center line 328 in the flow direction 340, in accordance with tapering of the tapered portion 325, or any degree of tapering desired. In such examples, such tapered structural tabs 350 may be part of or defined by the tapered portion 325. Further, in some additional or alternative examples, the voids 352 and/or portions of the outer wall 320 proximate to the voids 352 may be tapered as well, having a tapered void 353, as best shown in FIG. 40, converging about the duct center line 328 in the flow direction 340, in accordance with the general tapering of the tapered portion 325, or any degree of tapering desired. In such examples, such tapered areas proximate to the tapered voids 352 may be part of or defined by the tapered portion 325.

INDUSTRIAL APPLICABILITY

The present disclosure relates generally to internal combustion engines and, more specifically, to ducted combustion systems. While the present disclosure shows the embodiments as related to internal combustion engines having reciprocating pistons, the teachings of the disclosure are certainly applicable to other combustion systems, which utilize diffusion or non-premixed flames, such as gas turbines, industrial burners, and the like. As discussed above, the various arrangements of ducts and their related elements are useful in promoting a substantially uniform fuel/air mixture within fuel jets and may inhibit or reduce entrainment of recirculated combustion products from downstream regions into upstream regions of fuel jets injected into combustion chambers. However, using such systems and methods for ducted combustion may also decrease fuel/air mixing, while reducing equivalence ratio at the lift-off length.

Figure 41:
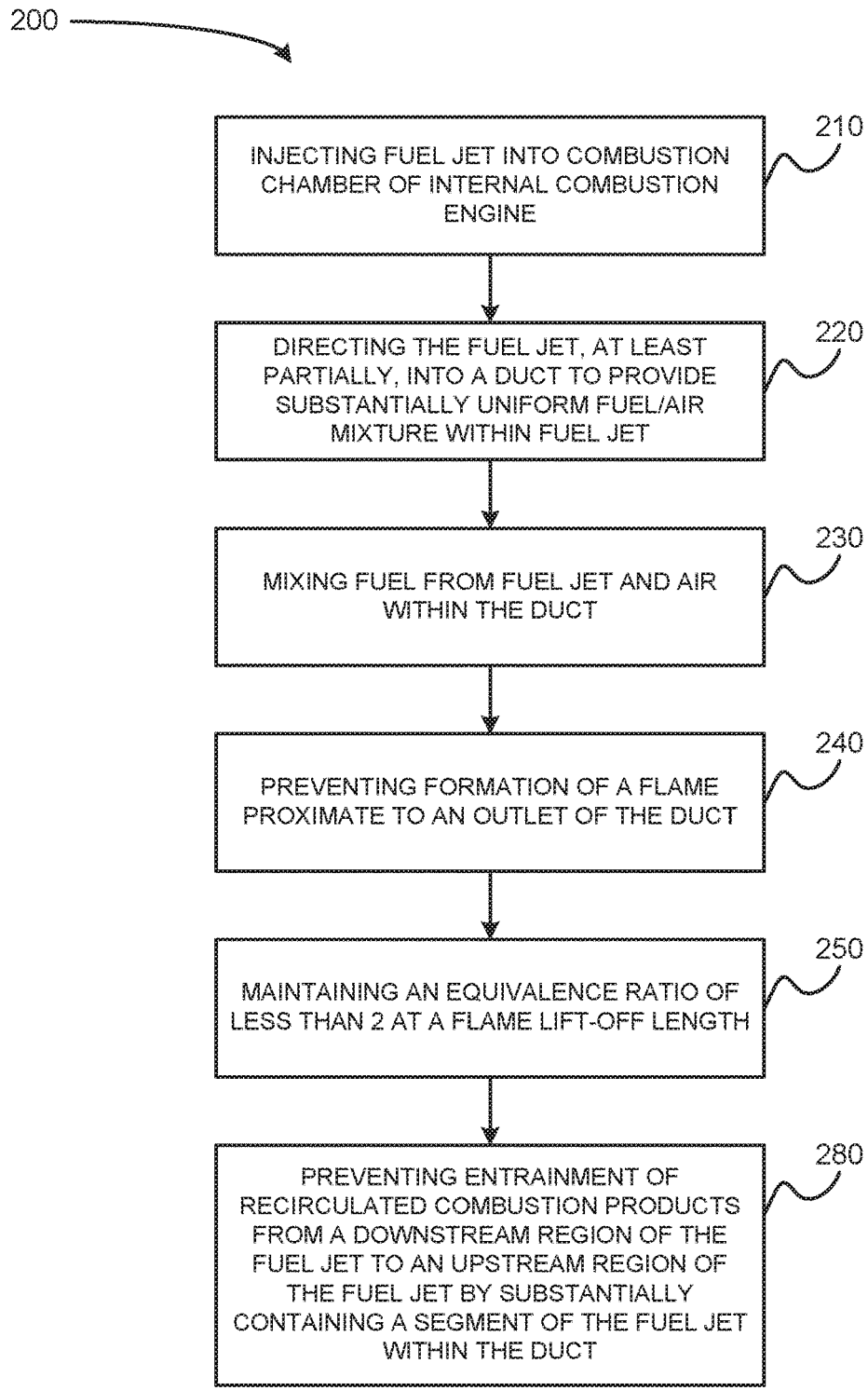
FIG. 41 is a block diagram of a flowchart representative of a method for operating a combustion system, in accordance with an embodiment of the disclosure.

An example method utilizing the ducted combustion systems shown in FIGS. 36-40 and described above is exemplified in the flowchart of FIG. 41, which represents a method 200 for operating a combustion system. The method 200 begins at block 210, by injecting a fuel jet 35 into the combustion chamber 14 of the internal combustion engine 10. The fuel jet 35 may be directed, at least partially, into a duct of the one or more ducts 300, to provide a substantially uniform fuel/air mixture within the fuel jet 35, as shown in block 220. As detailed above, the one or more ducts 300 may each include the one or more structural tabs 350 proximate to the outlet 345 of the one or more ducts 300.

In some examples, the method 200 may include mixing the fuel of the fuel jets 35 with air while the fuel jet is passing through the one or more ducts 300 at the outlet of the duct 345, by utilizing the one or more structural tabs 340, as shown in block 230. By utilizing the structural tabs 350 and, optionally, the tapered portion 325, inhibition of ignition of the fuel jet 35, thus preventing formation of a flame proximate to the outlet 345 of any of the one or more ducts 300, may be achieved, as reflected in block 240.

Accordingly, by utilizing the one or more ducts 300, which each may include one or more structural tabs 350, air entrainment at the outlet 347 of each of the one or more ducts 300 may be achieved. By providing air entrainment at the outlet 347 of the ducts 300, the structural tabs 350 may inhibit ignition of a flame, upstream of the duct outlet 347, within the ducts 300. By inhibiting flames within the one or more ducts 300, during a cycle of the engine 10, optimal lift off length may be achieved and soot reduction, within the combustion chamber 14, may be achieved.

The disclosed ducted combustion systems may be configured to use the one or more ducts 40 to direct combustion away from the fuel injector tip 32, so that the equivalence ratio at the flame lift-off length, produced during combustion, is lower. Using the one or more ducts 300, greater uniformity of equivalence ratio within the fuel jets 35 may be achieved. Maintaining a reduced equivalence ratio at the lift-off length may reduce soot formation. Achieving a reduced equivalence ratio at the lift-off length may be accomplished by altering the lift-off length, when employing any of the aspects of the present application. Alterations to the lift-off length may occur if heat is transferred from the fuel/air mixture of the fuel jets 35 to the one or more ducts 300. Additionally or alternatively, alterations to the lift-off length may be achieved by alteration of fuel jet fluid dynamics, which are resultant of characteristics of the ducts 40. Further, use of ducts 300 may prevent lift-off length recession by acting as a flame arrester.

Substantially soot-free combustion may be achieved if the equivalence ratio at the flame lift-off length is less than two. Therefore, at block 250, the method 200 may include maintaining an equivalence ratio less than two at the flame lift-off length.

FIGS. 42-44 show a variety of flames produced during combustion and having different lift-off lengths and associated equivalence ratios. First, the exemplary drawing of FIG. 42 shows a fuel jet 252 with a lift-off length 254, after which the fuel jet 252 ignites into a flame 256. Such examples may have a high equivalence ratio (e.g., in a range of 4-5) at the flame lift-off length 254. Such prior art examples may include unwanted soot production within a combustion chamber.

Turning to FIG. 43, a fuel jet 262 is shown with a lift-off length 264, after which the fuel jet ignites into a flame 266. Because of the use of a duct 268 (shown in a cross-sectional view) during combustion, the lift-off length 264 is greater and the equivalence ratio (e.g., around 2-3) at the lift-off length 264 may be lower than that of FIG. 37. Having the lower equivalence ratio may lead to reduced soot production during combustion.

Lastly, FIG. 44 shows a further improvement upon the prior art example of FIG. 37, in that the length of a duct 278 (shown in a cross-sectional view) is configured to have a length configured to have a low enough equivalence ratio (less than two) such that soot formation is inhibited. A flame 276 of a fuel jet 272 may be sufficiently far enough from a fuel injector such that it has an equivalence ratio of less than two at a lift-off length 274. It has been found that an equivalence ratio of less than two may produce great results in soot reduction. The lift-off length 274 which allows for the equivalence ratio to be less than two is enabled by using the duct 278, which extends sufficiently far enough from the injector to enable such an equivalence ratio.

Returning now to FIG. 41 and, more specifically, block 280, the method 200 may reduce entrainment of recirculated combustion products from a downstream region of the fuel jet 35 to an upstream region of the fuel jet 35 by substantially containing a segment of the fuel jet 35 within a duct 300. Reducing such entrainment may lead to an overall reduction in soot production within the combustion chamber 14 and may lead to greater overall efficiency of the internal combustion engine 10. Presence of ducts 40 may alter amount and position of entrainment of recirculated combustion products, within the fuel jets 35.

It will be appreciated that the present disclosure provides ducted combustion systems, internal combustion engines utilizing ducted combustion, and methods for operating combustion systems utilizing ducted combustion. While only certain embodiments have been set forth, alternatives and modifications will be apparent from the above description to those skilled in the art. These and other alternatives are considered equivalents and within the spirit and scope of this disclosure and the appended claims.

What is claimed is:

1. A ducted combustion system, comprising:
a combustion chamber defined as an enclosure bound at a first end by a flame deck surface of a cylinder head of an internal combustion engine, and bound at a second end by a piston top surface of a piston disposed within the internal combustion engine;
a fuel injector in fluid connection with the combustion chamber and including one or more orifices opening from an injector tip of the fuel injector, the one or more orifices injecting fuel into the combustion chamber as at least one fuel jet; and
at least one duct disposed within the combustion chamber between the flame deck surface and the piston top surface, the at least one duct including one or more structural tabs proximate to an outlet of the at least one duct and being disposed such that the at least one fuel jet, at least partially, enters the at least one duct upon being injected into the combustion chamber.

2. The ducted combustion system of claim 1, wherein the outlet of the at least one duct includes a tapered portion, which is tapered by converging towards a center line of the at least one duct.

3. The ducted combustion system of claim 2, wherein at least one of the one or more structural tabs are, at least partially, defined by the tapered portion, tapered with the outlet of the at least one duct and, at least partially, tapered by converging an outer wall of the at least one duct towards a center line of the at least one duct.

4. The ducted combustion system of claim 2, wherein an outer wall of the at least one duct converges in a fuel flow direction of the at least one fuel jet.

5. The ducted combustion system of claim 2, wherein the tapered portion includes one or more of tapered tabs and tapered voids, proximate to the outlet of the at least one duct.

6. The ducted combustion system of claim 1, wherein the one or more structural tabs are configured to inhibit ignition of the at least one fuel jet, upstream of the one or more structural tabs.

7. The ducted combustion system of claim 1, wherein the one or more structural tabs are arranged circumferentially about a circumference of the outlet of the at least one duct.

8. The ducted combustion system of claim 1, further comprising a plurality of valves located in the cylinder head, the plurality of valves including at least one air intake valve and at least one exhaust valve, and
wherein each of the at least one ducts is circumferentially disposed between two members of the plurality of valves.

9. An internal combustion engine, comprising:
an engine block having at least one cylinder bore;
a cylinder head having a flame deck surface disposed at one end of the cylinder bore;
a piston connected to a crankshaft and configured to reciprocate within the cylinder bore, the piston having a piston top surface facing the flame deck surface such that a combustion chamber is defined within the cylinder bore bound at a first end by the flame deck surface and at a second end by the piston top surface;
a fuel injector in fluid connection with the combustion chamber and including one or more orifices opening from an injector tip of the fuel injector, the one or more orifices injecting fuel into the combustion chamber as at least one fuel jet; and
at least one duct disposed within the combustion chamber between the flame deck and the piston top surface, the one or more including one or more structural tabs proximate to an outlet of the at least one duct and being disposed such that the at least one fuel jet at least partially enters the at least one duct upon being injected into the combustion chamber.

10. The internal combustion engine of claim 9, wherein the outlet of the at least one duct includes a tapered portion, which is tapered by converging towards a center line of the at least one duct.

11. The internal combustion engine of claim 10, wherein at least one of the one or more structural tabs are, at least partially, defined by the tapered portion, tapered with the outlet of the at least one duct and, at least partially, tapered by converging an outer wall of the at least one duct towards a center line of the at least one duct.

12. The internal combustion engine of claim 10, wherein an outer wall of the at least one duct converges in a fuel flow direction of the at least one fuel jet.

13. The internal combustion engine of claim 9, wherein the tapered portion includes one or both of a tapered tab and a tapered void, proximate to the outlet of the at least one duct.

14. The internal combustion engine of claim 9, wherein the one or more structural tabs are configured to inhibit ignition of the at least one fuel jet, upstream of the one or more structural tabs.

15. The internal combustion engine of claim 9, wherein the one or more structural tabs are arranged circumferentially about a circumference of the outlet of the at least one duct.

16. The internal combustion engine of claim 9, further comprising a plurality of valves located in the cylinder head, the plurality of valves including at least one air intake valve and at least one exhaust valve, and
wherein each of the at least one ducts is circumferentially disposed between two members of the plurality of valves.

* * * * *

UNITED STATES PATENT AND TRADEMARK OFFICE
CERTIFICATE OF CORRECTION

| | | |
|---|---|---|
| PATENT NO. | : 10,036,356 B2 | |
| APPLICATION NO. | : 15/373055 | |
| DATED | : July 31, 2018 | |
| INVENTOR(S) | : Kenth Svensson | |

It is certified that error appears in the above-identified patent and that said Letters Patent is hereby corrected as shown below:

In the Specification

Insert the following immediately after the title at Column 1:
--Statement of Government Interest
This invention was made with government support under contract CRADA: SC16/01875.00.00 awarded by the DOE. The Government has certain rights in this invention.--

Signed and Sealed this
First Day of November, 2022

Katherine Kelly Vidal
*Director of the United States Patent and Trademark Office*